(12) United States Patent
Liu et al.

(10) Patent No.: US 11,928,176 B2
(45) Date of Patent: Mar. 12, 2024

(54) TIME DOMAIN UNROLLING SPARSE MATRIX MULTIPLICATION SYSTEM AND METHOD

(71) Applicant: Arm Limited, Cambridge (GB)

(72) Inventors: Zhi-Gang Liu, Westford, MA (US); Paul Nicholas Whatmough, Cambridge, MA (US); Matthew Mattina, Boylston, MA (US)

(73) Assignee: Arm Limited, Cambridge (GB)

( * ) Notice: Subject to any disclaimer, the term of this patent is extended or adjusted under 35 U.S.C. 154(b) by 361 days.

(21) Appl. No.: 17/103,676

(22) Filed: Nov. 24, 2020

(65) Prior Publication Data

US 2022/0035890 A1 Feb. 3, 2022

Related U.S. Application Data

(60) Provisional application No. 63/058,850, filed on Jul. 30, 2020.

(51) Int. Cl.
*G06F 17/16* (2006.01)
*G06F 7/544* (2006.01)
(Continued)

(52) U.S. Cl.
CPC ............ *G06F 17/16* (2013.01); *G06F 7/5443* (2013.01); *G06F 15/80* (2013.01); *G06F 9/3893* (2013.01)

(58) Field of Classification Search
CPC ........ G06F 17/16; G06F 15/80; G06F 9/3893; G06F 7/5443; G06F 17/15–153
See application file for complete search history.

(56) References Cited

U.S. PATENT DOCUMENTS 9,818,059 B1 * 11/2017 Woo .................... G06N 3/0454
11,194,549 B2 * 12/2021 Liu ..................... G06F 7/5277
(Continued)

OTHER PUBLICATIONS

Buluc et al., "Parallel Sparse Matrix-Vector and Matrix-Transpose-Vector Multiplication Using Compressed Sparse Blocks," SPAA '09 Proceedings of the twenty-first annual symposium on Parallelism in algorithms and architectures, 2009, pp. 233-244.
(Continued)

*Primary Examiner* — Matthew D Sandifer
(74) *Attorney, Agent, or Firm* — Leveque Intellectual Property Law, P.C.

(57) ABSTRACT

A system and method for multiplying matrices are provided. The system includes a processor coupled to a memory and a matrix multiply accelerator (MMA) coupled to the processor. The MMA is configured to multiply, based on a bitmap, a compressed first matrix and a second matrix to generate an output matrix including, for each element i,j of the output matrix, a calculation of a dot product of an $i^{th}$ row of the compressed first matrix and a $j^{th}$ column of the second matrix based on the bitmap. Or, the MMA is configured to multiply, based on the bitmap, the second matrix and the compressed first matrix and to generate the output matrix including, for each element i,j of the output matrix, a calculation of a dot product of an $i^{th}$ row of the second matrix and a $j^{th}$ column of the compressed first matrix based on the bitmap.

14 Claims, 16 Drawing Sheets

(51) Int. Cl.
*G06F 9/38* (2018.01)
*G06F 15/80* (2006.01)

(56) References Cited

U.S. PATENT DOCUMENTS

| | | | | |
|---|---|---|---|---|
| 2018/0121196 A1* | 5/2018 | Temam | ................ | G06F 9/3001 |
| 2018/0321938 A1* | 11/2018 | Boswell | ................ | G06F 9/3012 |
| 2019/0065150 A1* | 2/2019 | Heddes | ............... | G06F 15/8015 |
| 2019/0079903 A1* | 3/2019 | Dreyer | ................ | G06F 15/8076 |
| 2020/0228137 A1* | 7/2020 | Chinya | ................ | G06N 3/063 |

OTHER PUBLICATIONS

Jouppi et al., "In-Datacenter Performance Analysis of a Tensor Processing Unit," 44th International Symposium on Computer Architecture (ISCA), Toronto, Canada, Jun. 24-28, 2017.

Moons et al., "A 0.3-2.6 TOPS/W Precision-Scalable Processor for Real-Time Large-Scale ConvNets," IEEE Symposium on VLSI Circuits, Jun. 16, 2016, Honolulu, HI, US.

Parashar et al., "SCNN: An Accelerator for Compressed-sparse Convolutional Neural Networks," arXiv:1708.04485v1 [cs.NE] May 23, 2017.

Chen et al., "Eyeriss: A Spatial Architecture for Energy-Efficient Dataflow for Convolutional Neural Networks," 2016 ACM/IEEE 43rd Annual International Symposium on Computer Architecture (ISCA), Seoul, 2016, pp. 367-379.

\* cited by examiner

FIG. 4

$$a' \times w' = o'$$

$a'$ (4×8), $w'$ (8×4), $o'$ (4×4)

Matrix $a'$ (20):
| $a_{1,1}$ | $a_{1,2}$ | $a_{1,3}$ | $a_{1,4}$ | $a_{1,5}$ | $a_{1,6}$ | $a_{1,7}$ | $a_{1,8}$ |
| $a_{2,1}$ | $a_{2,2}$ | $a_{2,3}$ | $a_{2,4}$ | $a_{2,5}$ | $a_{2,6}$ | $a_{2,7}$ | $a_{2,8}$ |
| $a_{3,1}$ | $a_{3,2}$ | $a_{3,3}$ | $a_{3,4}$ | $a_{3,5}$ | $a_{3,6}$ | $a_{3,7}$ | $a_{3,8}$ |
| $a_{4,1}$ | $a_{4,2}$ | $a_{4,3}$ | $a_{4,4}$ | $a_{4,5}$ | $a_{4,6}$ | $a_{4,7}$ | $a_{4,8}$ |

Matrix $w'$ (30):
| 0 | $w_{2,1}$ | 0 | $w_{4,1}$ | 0 | $w_{6,1}$ | 0 | $w_{8,1}$ |
| $w_{1,2}$ | 0 | $w_{3,2}$ | 0 | 0 | $w_{6,2}$ | $w_{7,2}$ | 0 |
| $w_{1,3}$ | 0 | $w_{3,3}$ | 0 | $w_{5,3}$ | 0 | 0 | $w_{8,3}$ |
| 0 | $w_{2,4}$ | 0 | $w_{4,4}$ | 0 | $w_{6,4}$ | 0 | $w_{8,4}$ |

Matrix $o'$ (40):
| $o_{1,1}$ | $o_{1,2}$ | $o_{1,3}$ | $o_{1,4}$ |
| $o_{2,1}$ | $o_{2,2}$ | $o_{2,3}$ | $o_{2,4}$ |
| $o_{3,1}$ | $o_{3,2}$ | $o_{3,3}$ | $o_{3,4}$ |
| $o_{4,1}$ | $o_{4,2}$ | $o_{4,3}$ | $o_{4,4}$ |

TIME DOMAIN UNROLLING SPARSE MATRIX MULTIPLICATION SYSTEM AND METHOD

CROSS-REFERENCE TO RELATED APPLICATIONS

This application claims the benefit of U.S. Provisional Patent Application Ser. No. 63/058,850 (filed on Jul. 30, 2020), which is incorporated herein by reference in its entirety.

BACKGROUND

The present disclosure relates to computer systems. More particularly, the present disclosure relates to a matrix multiplication system and method.

Artificial neural networks (ANNs), such as deep neural networks (DNNs), convolutional neural networks (CNNs), etc., are a popular solution to a wide array of challenging classification, recognition and regression problems. However, many ANN models require a large number of calculations involving a large number of weights and activations, which presents a significant challenge with respect to access, storage and performance, particularly for mobile and other power or storage-constrained devices. An ANN hardware accelerator accelerates these calculations, such as, for example, convolution operations performed by CNNs.

Typically, native convolution operations are not performed by a CNN due to the complicated dataflow and expensive datapaths that are usually required. Instead, native convolution operations are converted into generic matrix multiplication (GEMM) operations, and then the GEMM operations are executed more efficiently by a central processing unit (CPU), specialized processor, hardware accelerator processing engine, etc., using optimized software libraries or specialized hardware. More particularly, an "IM2COL" software function may be used to convert the filter (weight) matrix and the input feature map (IFM) matrix for each convolution operation into an expanded format that is compatible with a GEMM operation. The IM2COL versions of each filter (weight) matrix and each IFM matrix are generated and stored in memory, and then loaded from memory and processed by the GEMM operation.

Generally, matrices may be classified as either sparse or dense. Most elements of a sparse matrix have a value of zero, while most elements of a dense matrix have a non-zero value. For the simple matrix multiplication operation C=A× B, when matrix A or matrix B is sparse, most of the matrix calculations will include a value of zero for at least one of the operands. When both matrix A and matrix B are sparse, an even greater number of matrix calculations will include a value of zero for at least one of the operands. Since multiplication by an operand that has a value of zero will always result in a product that has a value of zero, applying standard matrix multiplication techniques to sparse matrices is very inefficient due to the large number of operands that have a value of zero.

BRIEF DESCRIPTION OF THE DRAWINGS

FIG. 4 depicts multiplication of two matrices to generate an output matrix, in accordance with an embodiment of the present disclosure.

DETAILED DESCRIPTION

Figure 1:
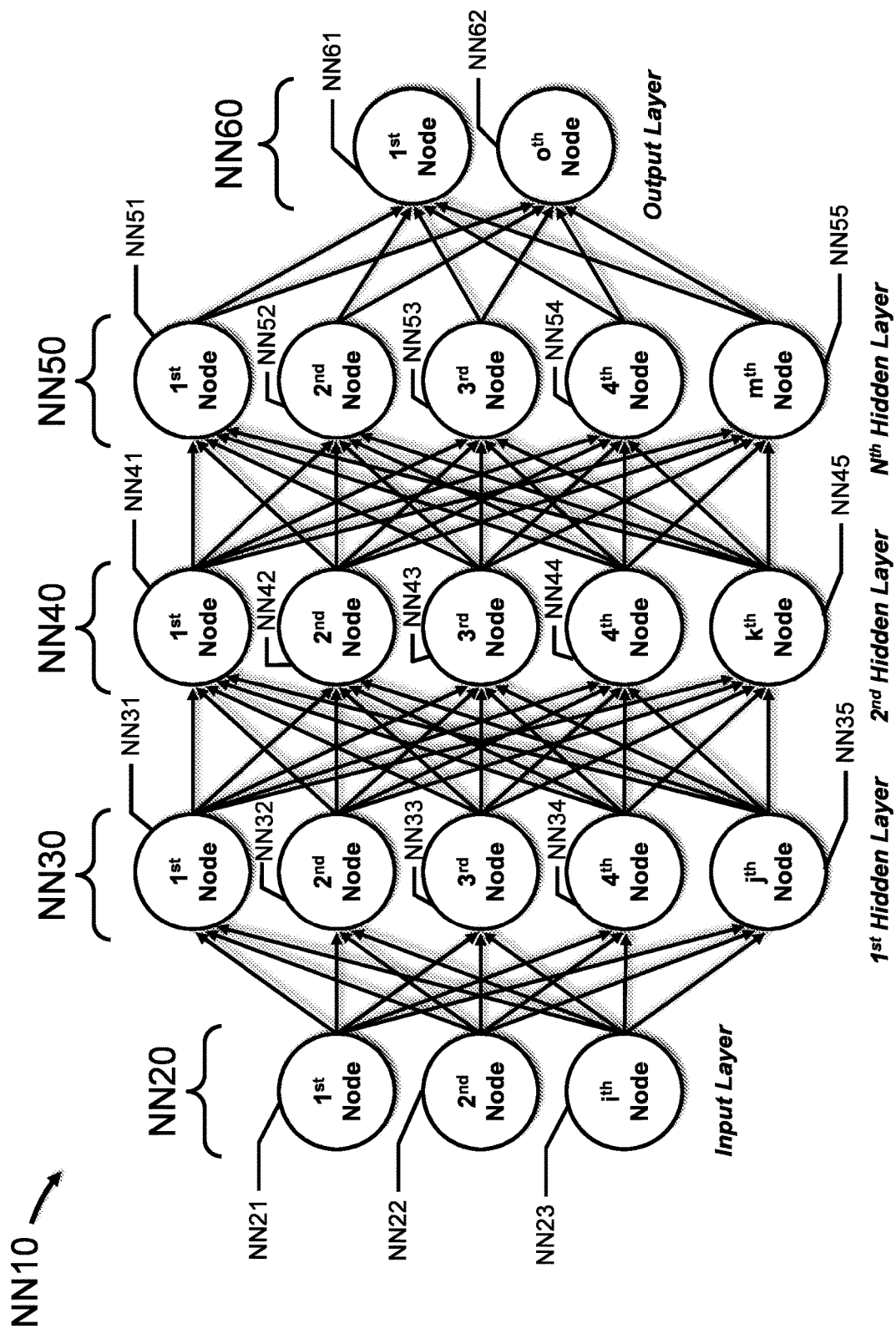
FIG. 1 depicts an ANN, in accordance with embodiments of the present disclosure.

Embodiments of the present disclosure will now be described with reference to the drawing figures, in which like reference numerals refer to like parts throughout.

Embodiments of the present disclosure advantageously provide a system and method for multiplying matrices that significantly reduce "multiply by zero" conditions. Embodiments of the present disclosure are applicable to the multiplication of a dense matrix with a "sparse" matrix, and many embodiments accommodate any degree of sparsity ratio.

In one embodiment, a system includes a processor coupled to a memory, and a matrix multiply accelerator (MMA) coupled to the processor. The MMA is configured to multiply, based on a bitmap, a compressed first matrix and a second matrix to generate an output matrix including, for each element i,j of the output matrix, calculate a dot product of an $i^{th}$ row of the compressed first matrix and a $j^{th}$ column of the second matrix based on the bitmap. Or, the MMA is configured to multiply, based on the bitmap, the second matrix and the compressed first matrix and to generate the output matrix including, for each element i,j of the output matrix, calculate a dot product of an $i^{th}$ row of the second matrix and a $j^{th}$ column of the compressed first matrix based on the bitmap. The bitmap includes a plurality of bit positions, and each bit position corresponds to a different element of the first matrix.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

FIG. 1 depicts ANN NN10, in accordance with an embodiment of the present disclosure.

ANN NN10 includes input layer NN20, one or more hidden layers NN30, NN40, NN50, etc., and output layer NN60. Input layer NN20 includes one or more input nodes NN21, NN22, NN23, etc. Hidden layer NN30 includes one or more hidden nodes NN31, NN32, NN33, NN34, NN35, etc. Hidden layer NN40 includes one or more hidden nodes NN41, NN42, NN43, NN44, NN45, etc. Hidden layer NN50 includes one or more hidden nodes NN51, NN52, NN53, NN54, NN55, etc. Output layer NN60 includes one or more output nodes NN61, NN62, etc. Generally, ANN NN10 includes N hidden layers, input layer NN20 includes "i" nodes, hidden layer NN30 includes "j" nodes, hidden layer NN40 includes "k" nodes, hidden layer NN50 includes "m" nodes, and output layer NN60 includes "o" nodes.

In one embodiment, N equals 3, i equals 3, j, k and m equal 5 and o equals 2 (depicted in FIG. 1). Input node NN21 is coupled to hidden nodes NN31 to NN35, input node NN22 is coupled to hidden nodes NN31 to NN35, and input node NN23 is coupled to hidden nodes NN31 to NN35. Hidden node NN31 is coupled to hidden nodes NN41 to NN45, hidden node NN32 is coupled to hidden nodes NN41 to NN45, hidden node NN33 is coupled to hidden nodes NN41 to NN45, hidden node NN34 is coupled to hidden nodes NN41 to NN45, and hidden node NN35 is coupled to hidden nodes NN41 to NN45. Hidden node NN41 is coupled to hidden nodes NN51 to NN55, hidden node NN42 is coupled to hidden nodes NN51 to NN55, hidden node NN43 is coupled to hidden nodes NN51 to NN55, hidden node NN44 is coupled to hidden nodes NN51 to NN55, and hidden node NN45 is coupled to hidden nodes NN51 to NN55. Hidden node NN51 is coupled to output nodes NN61 and NN62, hidden node NN52 is coupled to output nodes NN61 and NN62, hidden node NN53 is coupled to output nodes NN61 and NN62, hidden node NN54 is coupled to output nodes NN61 and NN62, and hidden node NN55 is coupled to output nodes NN61 and NN62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
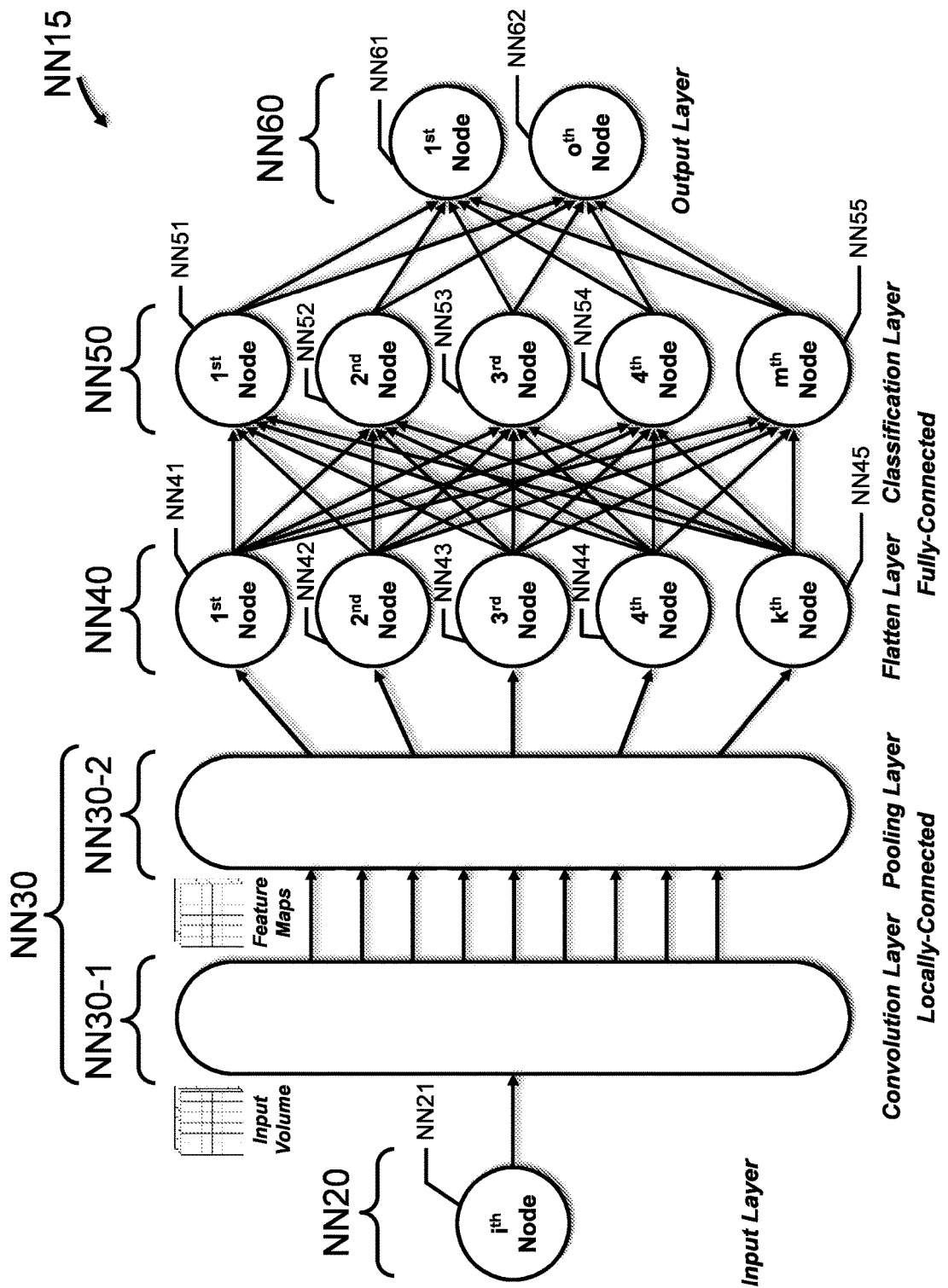
FIG. 2 depicts a CNN, in accordance with embodiments of the present disclosure.

FIG. 2 depicts CNN NN15, in accordance with an embodiment of the present disclosure. CNN NN15 includes input layer NN20, one or more hidden layers, such as convolutional layer NN30-1, pooling layer NN30-2, hidden (flatten) layer NN40, hidden (classification) layer NN50, etc., and output layer NN60. Many other variations of input, hidden and output layers are contemplated.

Input layer NN20 includes one or more input nodes NN21, etc., that present the input data, such as a color image, as an input volume to the first convolutional layer, e.g., convolutional layer NN30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer NN30-1 is locally-connected to input layer NN20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer NN30-2 is locally-connected to convolutional layer NN30-1, and includes a plurality of nodes that are connected to local regions in the input volume (not depicted for clarity). Pooling layer NN30-2 also produces an output volume that is provided as the input volume to the subsequent layer, such as, for example, another convolutional layer NN30-1, a flatten layer NN40, etc. In certain embodiments, convolutional layer NN30-1 and pooling layer NN30-2 form a single hidden layer NN30. Similarly, in certain embodiments, convolutional layer NN30-1, a ReLU layer and pooling layer NN30-2 form a single hidden layer NN30. Generally, the output volumes of the convolutional and pooling layers may be described as feature maps, and one or more single hidden layers NN30 form a feature learning portion of CNN NN15.

Hidden layer NN40 is a "flatten" layer that is locally-connected to pooling layer NN30-2, and includes one or more hidden (flatten) nodes NN41, NN42, NN43, NN44, NN45, etc. Hidden (flatten) layer NN40 "flattens" the output volume produced by the preceding pooling layer NN30-2 into a column vector, which is provided to the subsequent, fully-connected hidden layer NN50.

Hidden layer NN50 is a classification layer that is fully-connected to hidden (flatten) layer NN40, and includes one or more hidden (classification) nodes NN51, NN52, NN53, NN54, NN55, etc.

Output layer NN60 includes one or more output nodes NN61, NN62, etc., and is fully-connected to hidden (classification) layer NN50. Fully-connected output layer NN60 receives the classification results output by hidden (classification) layer NN50, and each node outputs a predicted class score. A normalization function, such as a Softmax function, may be applied to the predicted class scores by output layer NN60, or, alternatively, by an additional layer interposed between hidden (classification) layer NN50 and output layer NN60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by CNNs, as well as other ANNs.

Figure 3A:
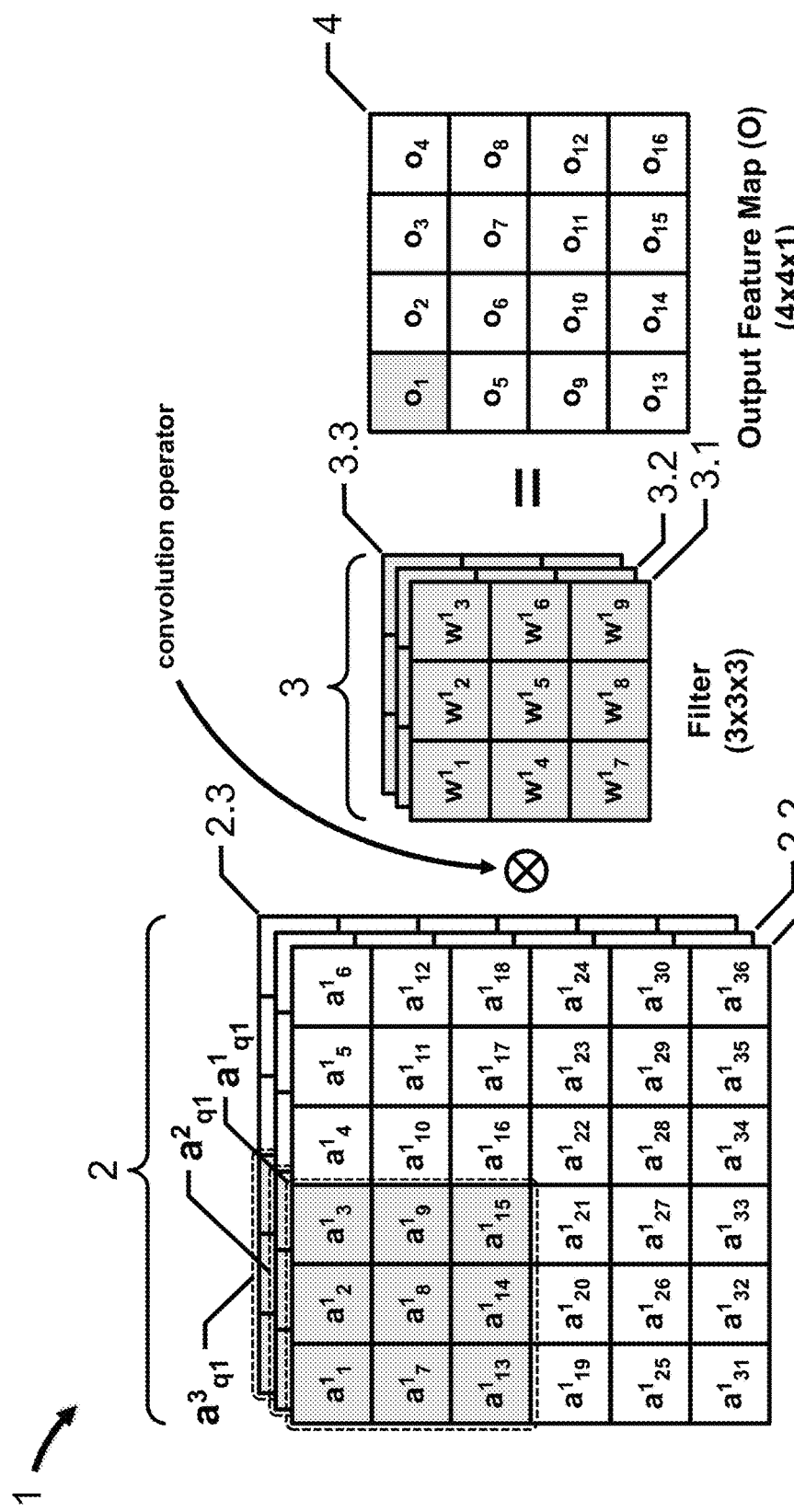
FIG. 3A depicts convolutional layer calculation for a CNN, in accordance with an embodiment of the present disclosure.

FIG. 3A depicts convolutional layer calculation 1 for a CNN, in accordance with an embodiment of the present disclosure.

Input feature maps 2 (6×6×3) includes input data matrix 2.1, input data matrix 2.2 and input data matrix 2.3, filter 3 (3×3×3) includes weight matrix 3.1 ($w^1$), weight matrix 3.2 ($w^2$), and weight matrix 3.3 ($w^3$), and output feature map 4 (4×4×1) includes an output data matrix. Filter 3 is convolved with input feature maps 2 to produce output feature map 4. In this example, the output data matrix element $o_1$ is the sum of the dot products of filter 3.1 ($w^1$) and the upper left quadrant of input data matrix 2.1 ($a^1_{q1}$), filter 3.2 ($w^2$) and the upper left quadrant of input data matrix 2.2 ($a^2_{q1}$), and filter 3.3 ($w^3$) and the upper left quadrant of input data matrix 2.3 ($a^3_{q1}$).

More particularly, the dot product of filter 3.1 ($w^1$) and the upper left quadrant of input data matrix 2.1 ($a^1_{q1}$) is equal to $a^1_1 \times w^1_1 + a^1_2 \times w^1_2 + a^1_3 \times w^1_3 + a^1_7 \times w^1_4 + a^1_8 \times w^1_5 + a^1_9 \times w^1_6 + a^1_{13} \times w^1_7 + a^1_{14} \times w^1_8 + a^1_{15} \times w^1_9$. The dot products of filter 3.2 ($w^2$) and the upper left quadrant of input data matrix 2.2 ($a^2_{q1}$), and filter 3.3 ($w^3$) and the upper left quadrant of input data matrix 2.3 ($a^3_{q1}$) are calculated in the same manner, i.e., the dot product of filter 3.2 ($w^2$) and the upper left quadrant of input data matrix 2.2 ($a^2_{q1}$) is equal to $a^2_1 \times w^2_1 + a^2_2 \times w^2_2 + a^2_3 \times w^2_3 + a^2_7 \times w^2_4 + a^2_8 \times w^2_5 + a^2_9 \times w^2_6 + a^2_{13} \times w^2_7 + a^2_{14} \times w^2_8 + a^2_{15} \times w^2_9$, and the dot product of filter 3.3 ($w^3$) and the upper left quadrant of input data matrix 2.3 ($a^3_{q1}$) is equal to $a^3_1 \times w^3_1 + a^3_2 \times w^3_2 + a^3_3 \times w^3_3 + a^3_7 \times w^3_4 + a^3_8 \times w^3_{5+a^3_9} \times w^3_6 + a^3_{13} \times w^3_7 + a^3_{14} \times w^3_8 + a^3_{15} \times w^3_9$.

Output data matrix element $o_2$ is the sum of the dot products of filter 3.1 ($w^1$) and the next upper quadrant of input data matrix 2.1, filter 3.2 ($w^2$) and the next upper quadrant of input data matrix 2.2, and filter 3.3 ($w^3$) and the next upper quadrant of input data matrix 2.3. The "next" upper quadrant in each input data matrix 2.1, 2.2 and 2.3 has been shifted one column to the right relative to the first upper quadrant. More particularly, the dot product of filter 3.1 ($w^1$) and the next upper quadrant of input data matrix 2.1 is equal to $a^1_2 \times w^1_1 + a^1_3 \times w^1_2 + a^1_4 \times w^1_3 + a^1_8 \times w^1_4 + a^1_9 \times w^1_5 + a^1_{10} \times w^1_6 + a^1_{14} \times w^1_7 + a^1_{15} \times w^1_8 + a^1_{16} \times w^1_9$. The dot products of filter 3.2 ($w^2$) and the next upper quadrant of input data matrix 2.2, and filter 3.3 ($w^3$) and the next upper quadrant of input data matrix 2.3 are calculated in the same manner, i.e., the dot product of filter 3.2 ($w^2$) and the next upper quadrant of input data matrix 2.2 is equal to $a^2_2 \times w^2_1 + a^2_3 \times w^2_2 + a^2_4 \times w^2_3 + a^2_8 \times w^2_4 + a^2_9 \times w^2_5 + a^2_{10} \times w^2_6 + a^2_{14} \times w^2_7 + a^2_{15} \times w^2_8 + a^2_{16} \times w^2_9$, and the dot product of filter 3.3 ($w^3$) and the next upper quadrant of input data matrix 2.3 is equal to $a^3_2 \times w^3_1 + a^3_3 \times w^3_2 + a^3_4 \times w^3_3 + a^3_8 \times w^3_4 + a^3_9 \times w^3_5 + a^3_{10} \times w^3_6 + a^3_{14} \times w^3_7 + a^3_{15} \times w^3_8 + a^3_{16} \times w^3_9$.

Figure 3B:
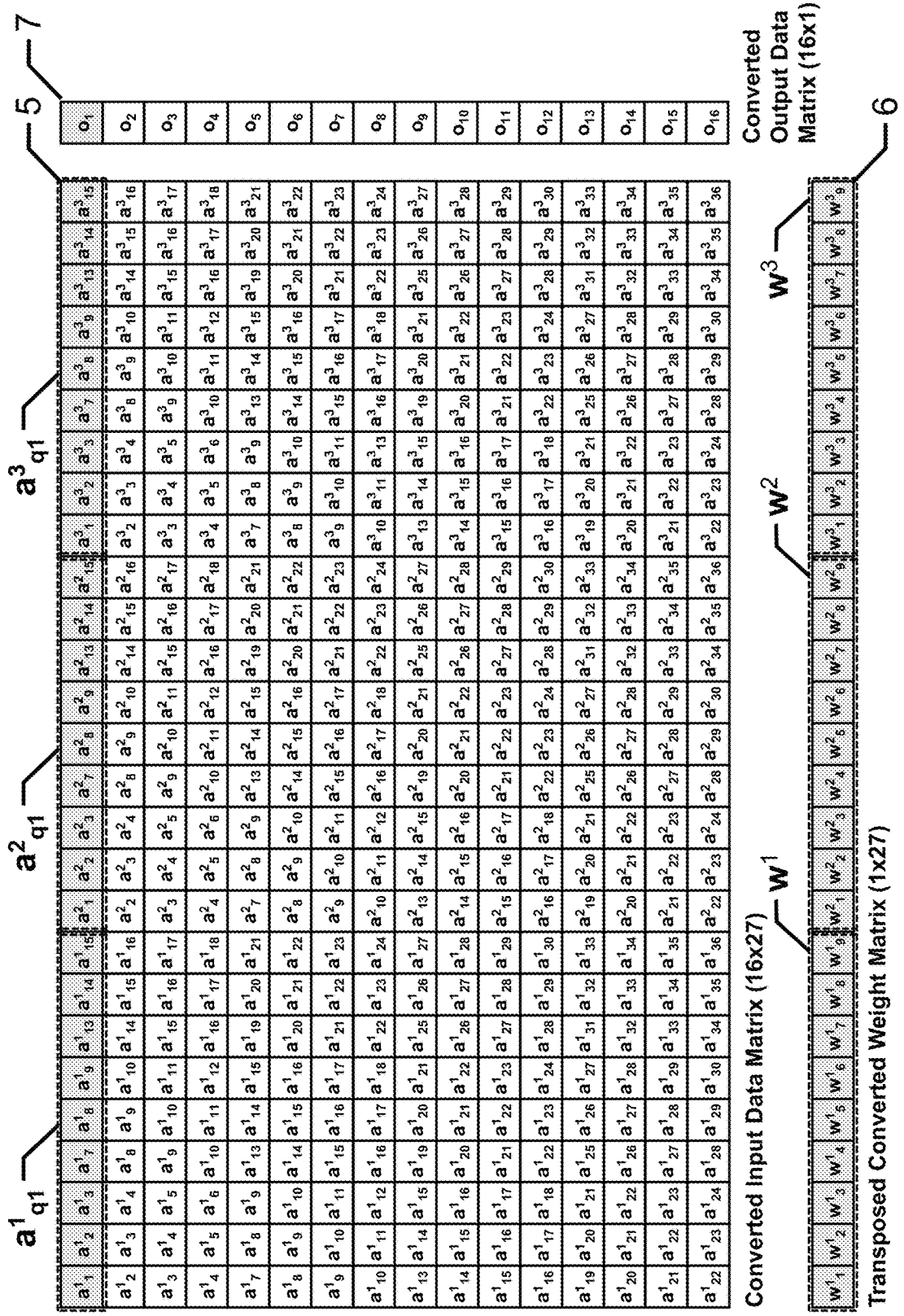
FIG. 3B depicts a converted convolutional layer calculation for a CNN, in accordance with an embodiment of the present disclosure.

FIG. 3B depicts a converted convolutional layer calculation for a CNN, in accordance with an embodiment of the present disclosure.

In one embodiment, the convolutional layer calculations for CNNs executing on central processor units (CPUs) may be converted into generic matrix multiplication (GEMM) operations, which may leverage GEMM-optimized software libraries. Convolution layer calculation 1 is converted into a GEMM operation by converting input feature maps 2 into converted input data matrix 5 (16×27) and filter 3 into converted weight matrix 6 (27×1). After multiplying converted input data matrix 5 and converted weight matrix 6, converted output data matrix 7 (16×1) is then reformed into output feature map 4 (4×4). For ease of illustration, converted weight matrix 6 (27×1) is depicted in a transposed orientation (1×27) in FIG. 1B.

In this example, converted output data matrix element $o_1$ is the sum of the dot products of the first row of converted input data matrix 5 and the first (i.e., only) column of converted weight matrix 6. As shown in FIG. 1B, the first row of converted input data matrix 5 includes the elements of the upper left quadrant of input data matrix 2.1 ($a^1_{q1}$), the upper left quadrant of input data matrix 2.2 ($a^2_{q1}$), and the upper left quadrant of input data matrix 2.3 ($a^3_{q1}$), while the converted weight matrix 6 includes filter 3.1 ($w^1$), filter 3.2 ($w^2$), and filter 3.3 ($w^3$).

More particularly, the converted output data matrix element $o_1$ is equal to $a^1_1 \times w^1_1 + a^1_2 \times w^1_2 + a^1_3 \times w^1_3 + a^1_7 \times w^1_4 + a^1_8 \times w^1_5 + a^1_9 \times w^1_6 + a^1_{13} \times w^1_7 + a^1_{14} \times w^1_8 + a^1_{15} \times w^1_9 + a^2_1 \times w^2_1 + a^2_2 \times w^2_2 + a^2_3 \times w^2_3 + a^2_7 \times w^2_4 + a^2_8 \times w^2_5 + a^2_9 \times w^2_6 + a^2_{13} \times w^2_7 + a^2_{14} \times w^2_8 + a^2_{15} \times w^2_9 + a^3_1 \times w^3_1 + a^3_2 \times w^3_2 + a^3_3 \times w^3_3 + a^3_7 \times w^3_4 + a^3_8 \times w^3_5 + a^3_9 \times w^3_6 + a^3_{13} \times w^3_7 + a^3_{14} \times w^3_8 + a^3_{15} \times w^3_9$. As shown above, the converted output data matrix element $o_1$ is equal to the output data matrix element $o_1$.

In a "transposed" embodiment, convolution layer calculation 1 may be converted into a GEMM operation by converting input feature maps 2 into a transposed version of converted input data matrix 5 (27×16) and filter 3 into a transposed version of converted weight matrix 6 (1×27). After multiplying the transposed converted weight matrix 6 (1×27) and the transposed converted input data matrix 5 (27×16), a transposed version of converted output data matrix 7 (1×16) is then reformed into output feature map 4 (4×4).

Unfortunately, for CNNs executing on CPUs or other coprocessors, GEMM operations consume a significant number of processor cycles due to the large number of multiplications that are required. For example, one known image recognition CNN requires 3 giga operations per second (GOPS) per input data frame. Compounding this problem, many of the matrices upon which the GEMM operations are performed are sparse, which produces a very inefficient use of processing resources. Conversely, if GEMM operations could significantly reduce "multiply by zero" conditions, processing and power requirements could be significantly reduced. Known approaches that attempt to reduce "multiply by zero" conditions complicate the GEMM operations and introduce significant processing overhead on the CPU.

FIG. 4 depicts multiplication of two matrices to generate an output matrix, in accordance with an embodiment of the present disclosure.

In this embodiment, matrix 20 (4×8), labeled "a'," is multiplied with matrix 30 (8×4), labeled "w'," to produce output matrix 40 (4×4), labeled "o'." The dimensions of matrices 20, 30 and 40 were selected for the purpose of illustration; other matrix dimensions are clearly contemplated. With respect to FIG. 1B, matrix 20 may represent a version of a converted input data matrix, matrix 30 may represent a version of a converted weight matrix, and output matrix 40 may represent a version of a converted output data matrix. For the purpose of illustration, none of the elements of matrix 20 have a value of zero, while 50% of the elements of matrix 30 have a value of zero and 50% of the elements of matrix 30 have a value that is not zero. Due to the presence of at least one non-zero element in each column of matrix 20, none of the elements of output matrix 40 have a value that is zero. Matrix 30 may be considered to be either sparse or dense, depending on convention.

In the "transposed" embodiment, a transposed matrix 30 (4×8) may be multiplied with a transposed matrix 20 (8×4) to produce a transposed output matrix 40 (4×4).

Embodiments of the present disclosure advantageously provide a system and method for multiplying matrices that significantly reduce multiply by zero conditions. Embodiments of the present disclosure are applicable to the multiplication of a dense matrix with a sparse matrix, and many embodiments accommodate any degree of sparsity ratio.

Figure 5:
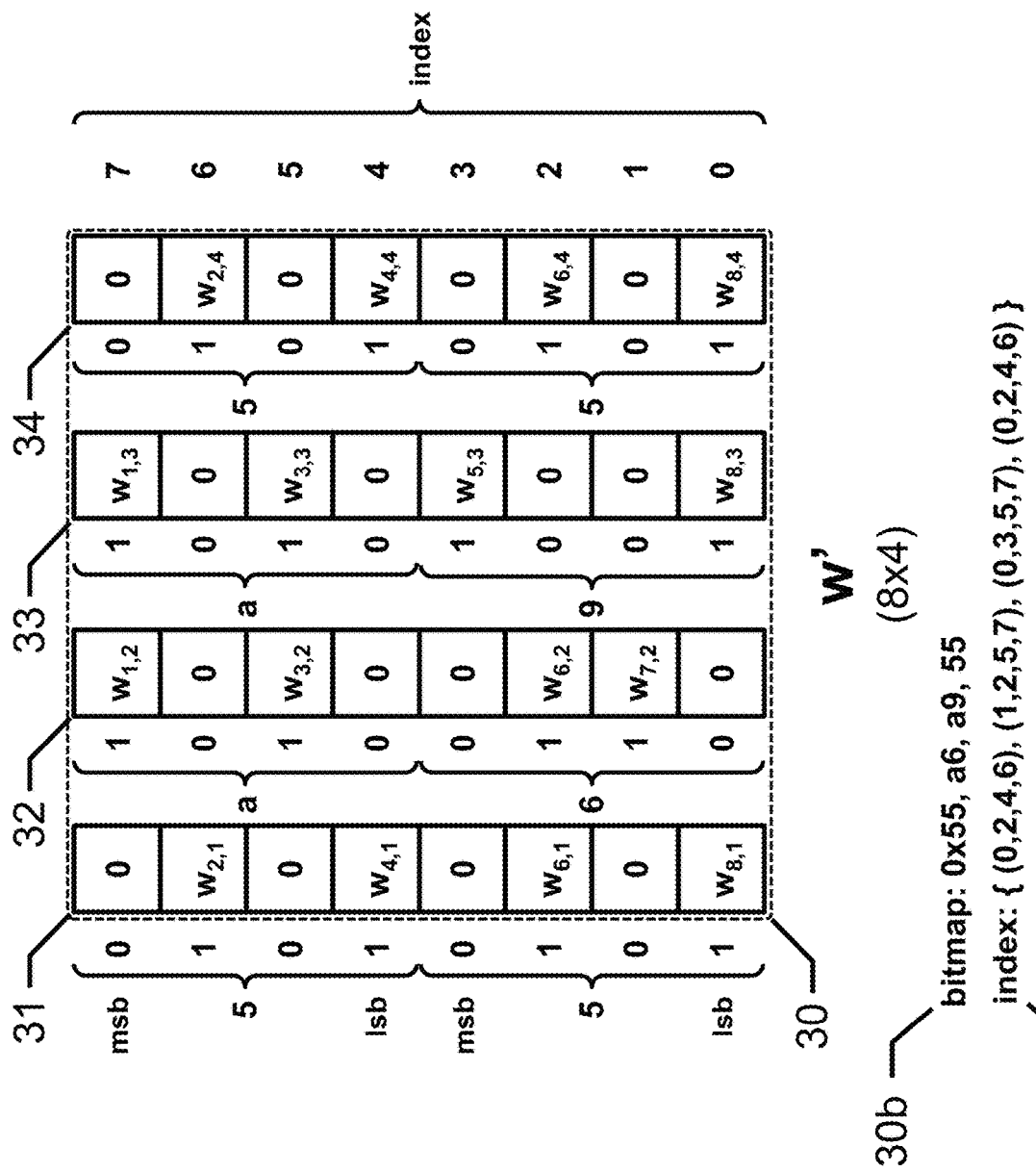
FIG. 5 depicts a matrix bitmap generation process, in accordance with an embodiment of the present disclosure.

FIG. 5 depicts a matrix bitmap generation process, in accordance with an embodiment of the present disclosure.

Matrix 30 includes four columns, i.e., column 31, column 32, column 33 and column 34. Each column includes four elements having a value of zero, and four elements having a non-zero value. Column 31 includes non-zero elements $w_{2,1}$, $w_{4,1}$, $w_{6,1}$ and $w_{8,1}$. Column 32 includes non-zero elements $w_{1,2}$, $w_{3,2}$, $w_{6,2}$ and $w_{7,2}$. Column 33 includes non-zero elements $w_{1,3}$, $w_{3,3}$, $w_{5,3}$ and $w_{8,3}$. Column 34 includes non-zero elements $w_{2,4}$, $w_{4,4}$, $w_{6,4}$ and $w_{8,4}$.

In one embodiment, a bitmap 30b may be determined for matrix 30 based on the non-zero elements. The bit values for each element of matrix 30 are depicted beside each column, in binary and hexadecimal formats. The bit values for each column are formed into nibbles, with the least significant bit (lsb) being the bottom-most bit, and the most significant bit (msb) being the top-most bit. The lower nibble (i.e., 4 bits) for column 31 has a value of "0101" or 0x5, and the upper nibble for column 31 has a value of "0101" or 0x5; the byte value for column 31 is "01010101" or 0x55. The lower nibble for column 32 has a value of "0110" or 0x6, and the upper nibble for column 32 has a value of "1010" or 0xa; the byte value for column 32 is "10100110" or 0xa6. The lower nibble for column 33 has a value of "1001" or 0x9, and the upper nibble for column 33 has a value of "1010" or 0xa; the byte value for column 33 is "10101001" or 0xa9. The lower nibble for column 34 has a value of "0101" or 0x5, and the upper nibble for column 34 has a value of "0101" or 0x5; the byte value for column 34 is "01010101" or 0x55. The value for bitmap 30b is 0x55a6a955, which includes 32 bits (4 bytes, 8 nibbles). In another embodiment, the least significant bit (lsb) is the top-most bit, and the most significant bit (msb) is the bottom-most bit of each nibble.

In another embodiment, an index 30c may be determined for matrix 30 based on the non-zero elements. The index values are depicted to the right of matrix 30, and begin at 0 (bottom-most row) and continue to 7 (top-most row). The index for each non-zero element in each column is determined, and then the indices are grouped into column sequences. The index sequence for column 31 is (0, 2, 4, 6), the index sequence for column 32 is (1,2,5,7), the index sequence for column 33 is (0,3,5,7), and the index sequence for column 34 is (0,2,4,6). The values for index 30c are {(0,2,4,6), (1,2,5,7), (0,3,5,7), (0,2,4,6)}. In another embodiment, the index values begin at 0 (top-most row) and continue to 7 (bottom-most row).

Figure 6:
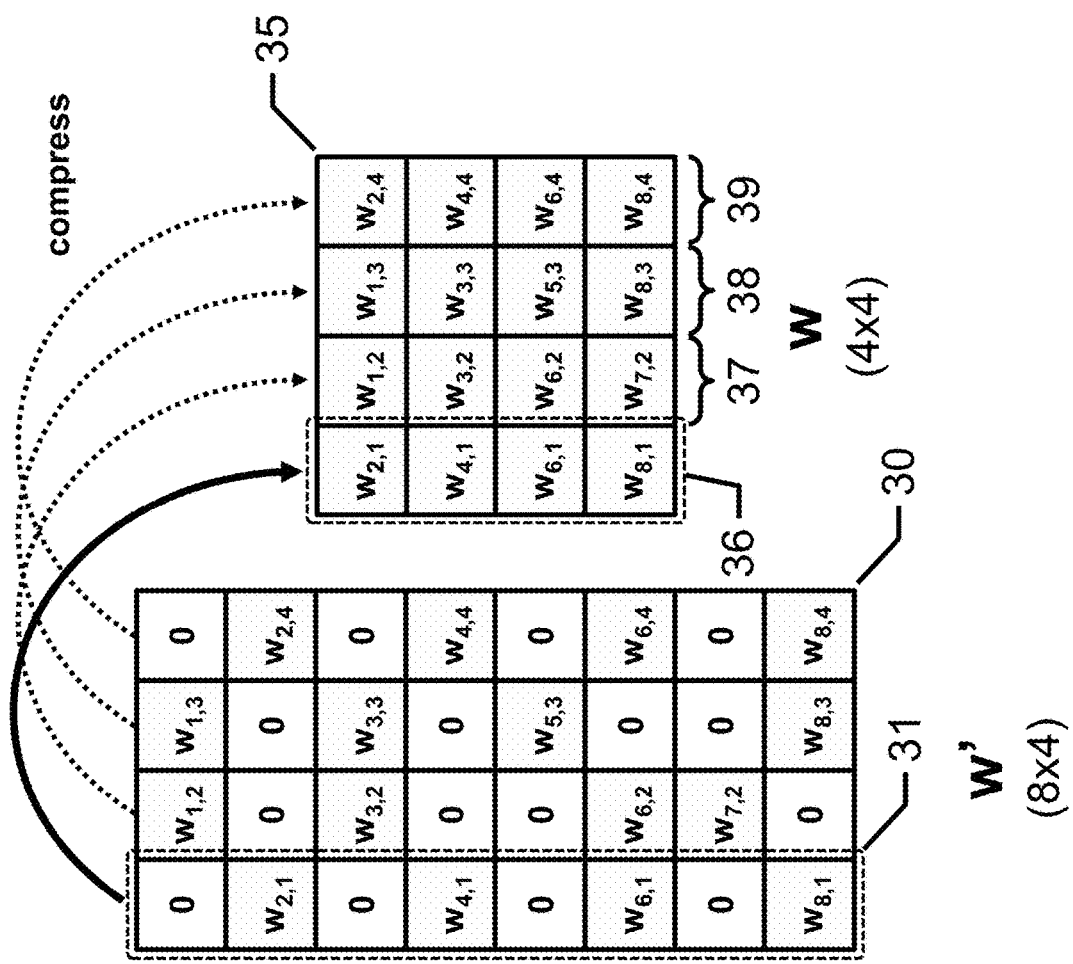
FIG. 6 depicts a matrix compression process, in accordance with an embodiment of the present disclosure.

FIG. 6 depicts a matrix compression process, in accordance with an embodiment of the present disclosure.

The dimensions of matrix 35 are determined based on the minimum number of zero-valued elements in each column of matrix 30. Generally, the column of matrix 30 with the least number of zero-valued elements determines the maximum amount of compression available for matrix 30. In alternative embodiments, elements of matrix 30 having a value above or below a predetermined threshold, outside a predetermined value range, etc., may be set to zero in order to increase the maximum amount of compression.

In this embodiment, columns 31, 32, 33 and 34 each have four zero-valued elements, so the maximum amount of compression is 4 elements per column. Matrix 30 may be compressed from an 8×4 matrix to a 4×4 matrix, as depicted in FIG. 6.

In another embodiment, column 31 has two zero-valued elements, and columns 32, 33 and 34 have four zero-valued elements. In this embodiment, the maximum amount of compression is 2 elements. Matrix 30 may be compressed from an 8×4 matrix to a 6×4 matrix. Compressed matrix 35 will include two zero-valued element in three columns, resulting in some degree of inefficiency. For extremely sparse matrices, matrix 30 may be compressed to a 1×4 matrix, resulting in at least a four-fold reduction of multiplication and accumulation operations. In all these embodiments, the output matrix will always be a 4×4 matrix. Other matrix dimensions are also contemplated.

In this embodiment, matrix 30 is compressed into matrix 35 in a column-wise manner. The non-zero value elements of column 31 form compressed column 36 of matrix 35, i.e., $w_{2,1}$, $w_{4,1}$, $w_{6,1}$ and $w_{8,1}$, in the same order. The non-zero value elements of column 32 form compressed column 37 of matrix 35, i.e., $w_{1,2}$, $w_{3,2}$, $w_{6,2}$ and $w_{7,2}$, in the same order. The non-zero value elements of column 33 form compressed column 38 of matrix 35, i.e., $w_{1,3}$, $w_{3,3}$, $w_{5,3}$ and $w_{8,3}$, in the same order. The non-zero value elements of column 34 form compressed column 39 of matrix 35, i.e., $w_{2,4}$, $w_{4,4}$, $w_{6,4}$ and $w_{8,4}$, in the same order.

Figure 7A:
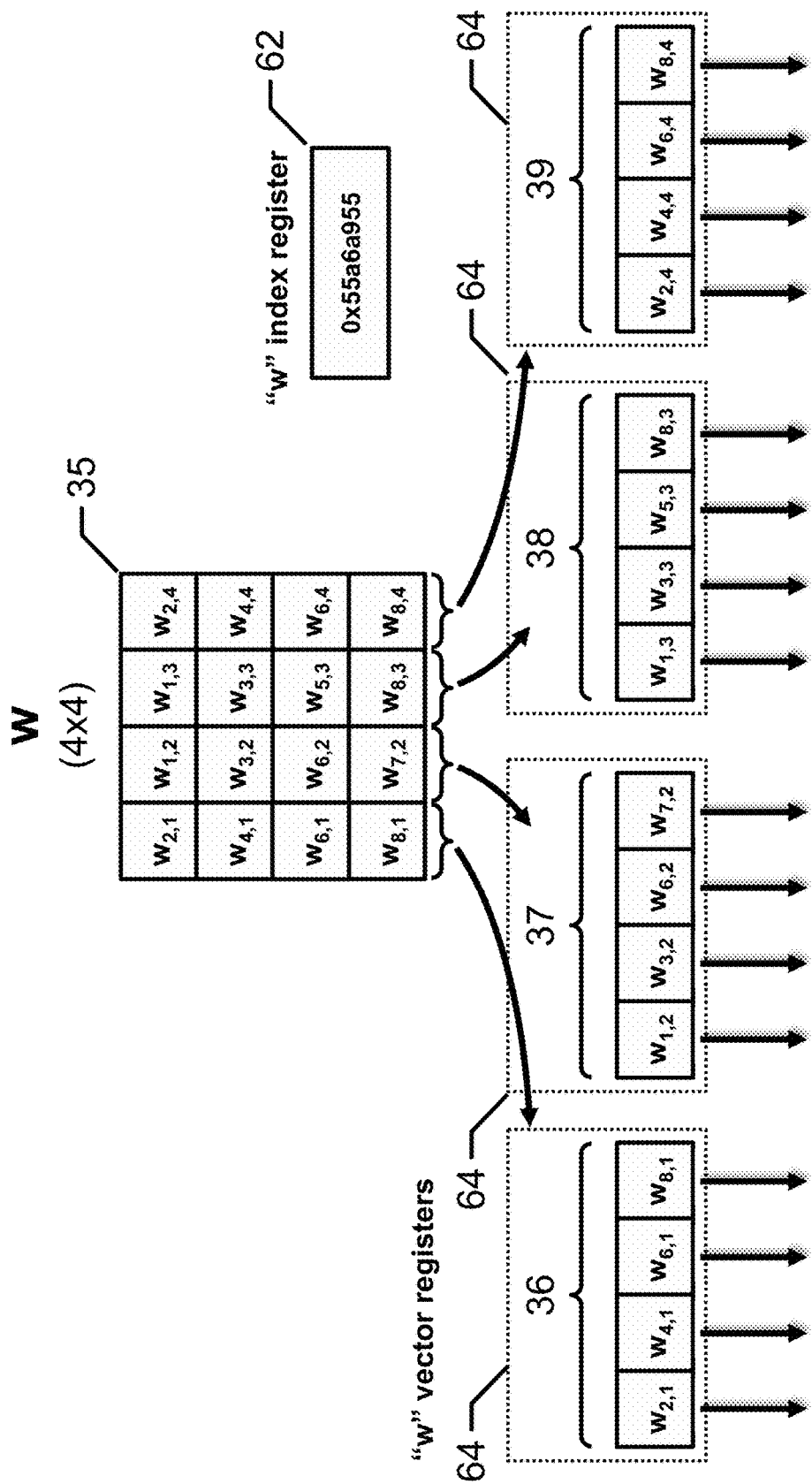
FIGS. 7A and 7B depict compressed matrix expansion processes, in accordance with an embodiment of the present disclosure.
Figure 7B:
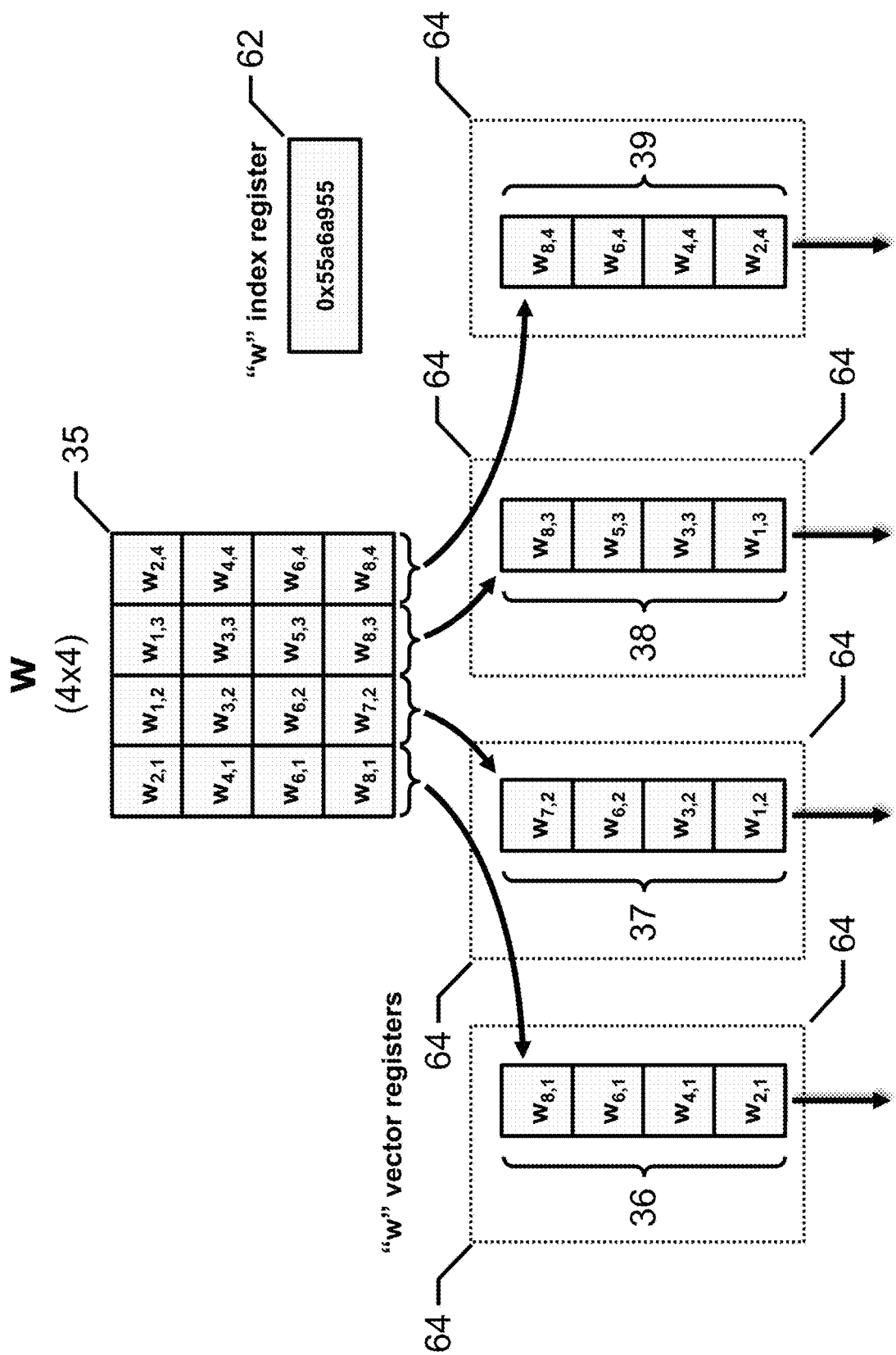

FIGS. 7A and 7B depict compressed matrix expansion processes, in accordance with an embodiment of the present disclosure.

In anticipation of the discussion below, matrix 35 may be expanded from a matrix representation that is stored in a memory (i.e., e.g., row-major order or column-major order) to a vector representation that is stored in one or more registers. In the embodiment depicted in FIG. 7A, matrix 35 is expanded by storing columns 36, 37, 38 and 39 in vector registers 64. Each vector register 64 simultaneously provides four element values to a respective column of PEs 250-1 in PE array 202-1 (depicted in FIG. 10A), as discussed below. In the embodiment depicted in FIG. 7B, matrix 35 is expanded by storing columns 36, 37, 38 and 39 in vector registers 64. Each vector register 64 sequentially provides four element values to a respective column of PEs 250-2 in PE array 202-2 (depicted in FIG. 10B), as discussed below. Bitmap 30b, or index 30c, is stored in scalar register 62.

Figure 8:
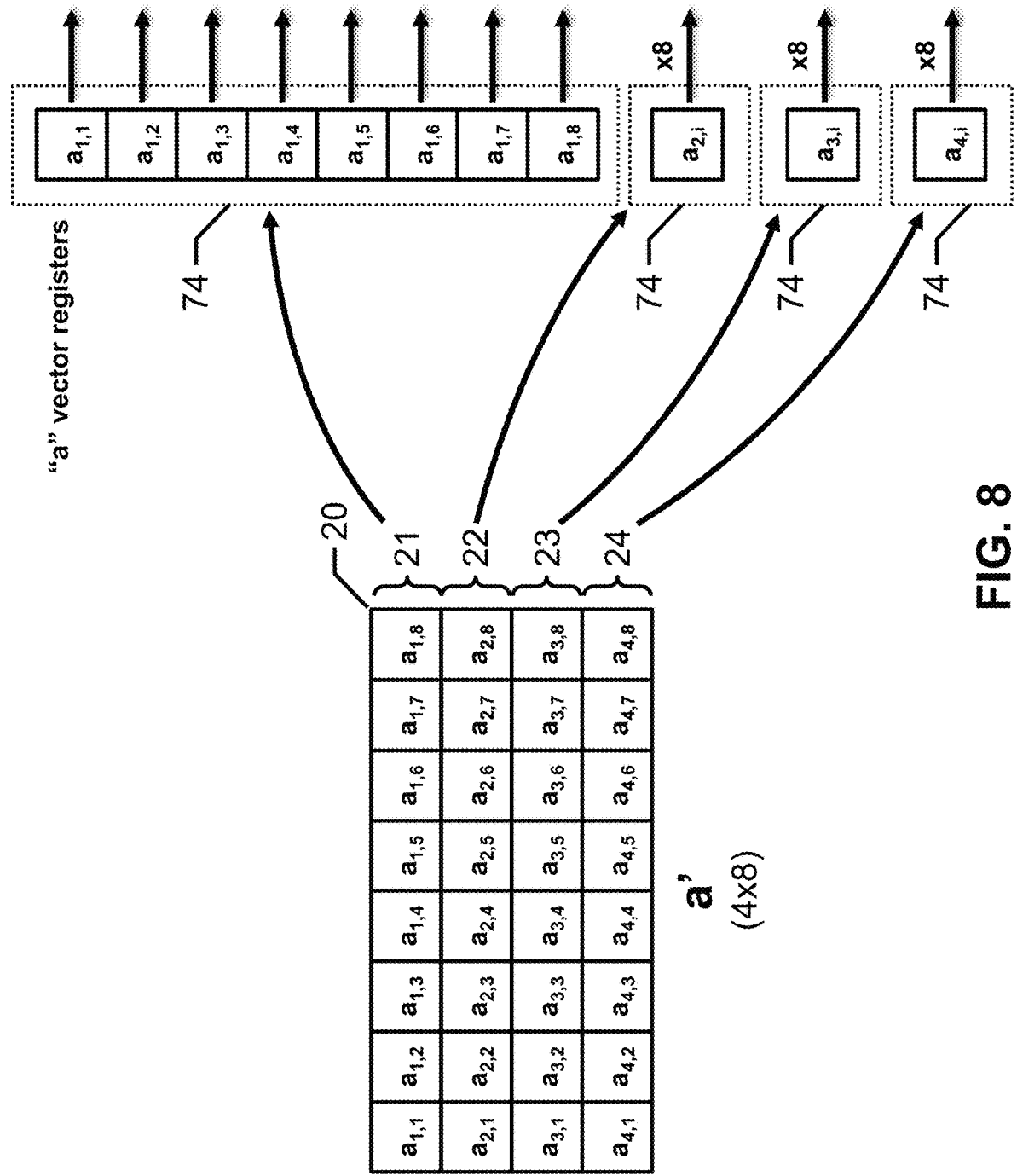
FIG. 8 depicts a matrix expansion process, in accordance with an embodiment of the present disclosure.

FIG. 8 depicts a matrix expansion process, in accordance with an embodiment of the present disclosure.

In anticipation of the discussion below, matrix 20 may be expanded from a matrix representation that is stored in a memory (i.e., e.g., row-major order or column-major order) to a vector representation that is stored in one or more registers. In the embodiment depicted in FIG. 8, matrix 20 is expanded by storing rows 21, 22, 23 and 24 in vector registers 74. Each vector register 74 simultaneously provides eight element values to a respective row of PEs 250-1 in PE array 202-1 (depicted in FIG. 10A), or eight element values to a respective row of PEs 250-2 in PE array 202-2 (depicted in FIG. 10B), as discussed below.

Figure 9:
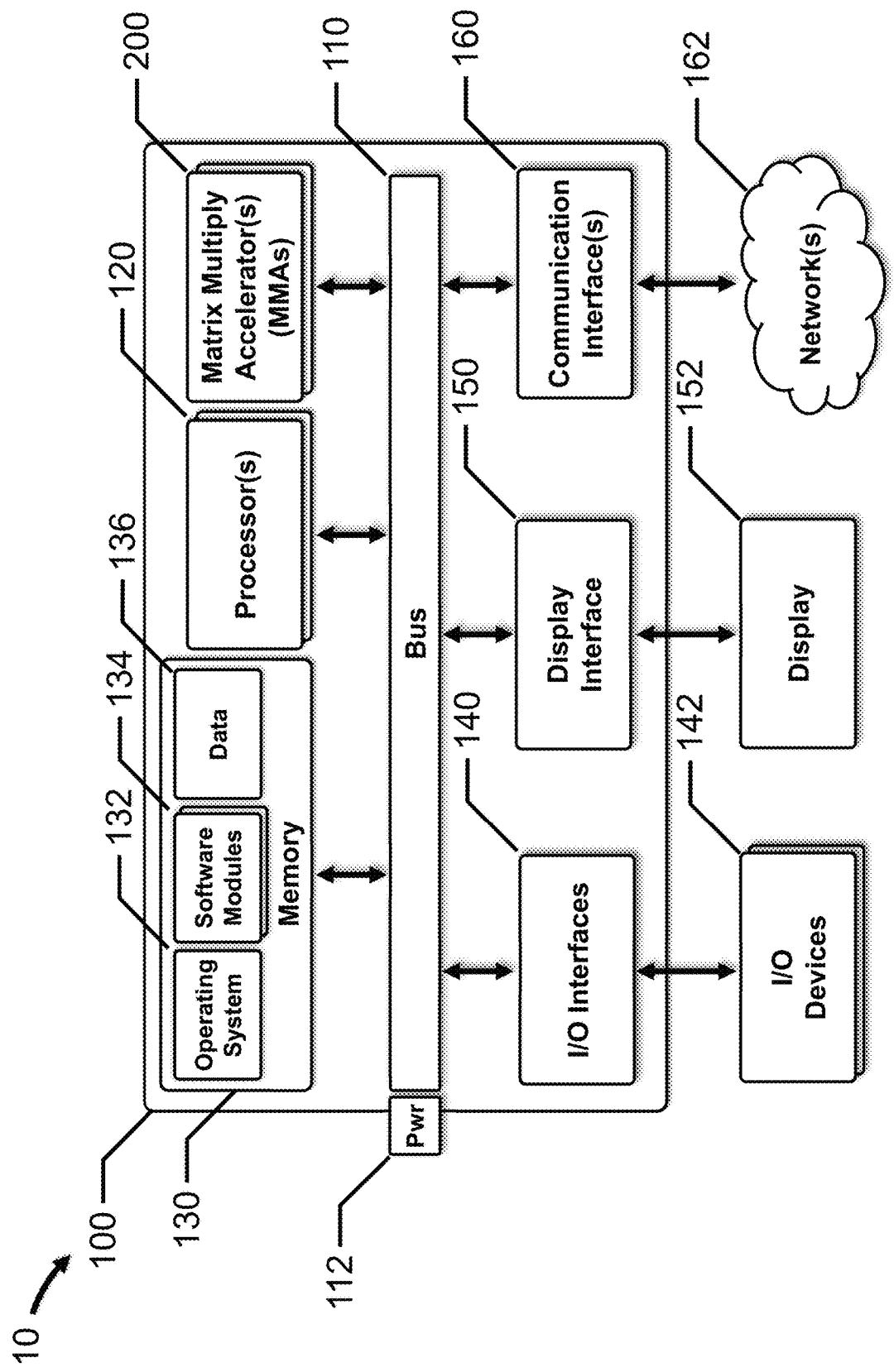
FIG. 9 depicts a block diagram of system, in accordance with an embodiment of the present disclosure.

FIG. 9 depicts a block diagram of system 10, in accordance with an embodiment of the present disclosure.

Computer 100 includes bus 110 coupled to one or more processors 120, memory 130, I/O interfaces 140, display interface 150, one or more communication interfaces 160 and one or more MMAs 200. Generally, I/O interfaces 140 are coupled to I/O devices 142 using a wired or wireless connection, display interface 150 is coupled to display 152, and communication interface 160 is connected to network 162 using a wired or wireless connection.

Bus 110 is a communication system that transfers data between processor 120, memory 130, I/O interfaces 140, display interface 150, communication interface 160, MMA 200, as well as other components not depicted in FIG. 1. Power connector 112 is coupled to bus 110 and a power supply (not shown).

Processor 120 includes one or more general-purpose or application-specific microprocessors that executes instructions to perform control, computation, input/output, etc. functions for computer 100. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, software modules 134, etc., stored within memory 130. For example, software modules 134 may include an ML application, an ANN application, a CNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and nonvolatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 100. Software modules 134 provide various functionality, such as image classification using convolutional neural networks, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as wireless local area networks (e.g., WI-FI™), wireless personal area networks (e.g., BLUETOOTH™), cellular, etc.

Generally, I/O devices 142 provide input to computer 100 and/or output from computer 100. As discussed above, I/O devices 142 are operably connected to computer 100 using a wired and/or wireless connection. I/O devices 142 may include a local processor coupled to a communication interface that is configured to communicate with computer 100 using the wired and/or wireless connection. For example, I/O devices 142 may include a keyboard, mouse, touch pad, joystick, etc.

Display interface 150 is configured to transmit image data from computer 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, wireless personal area networks (e.g., BLUETOOTH™), etc. Network 162 may also include various combinations of wired and/or wireless physical layers, such as, for example, copper wire or coaxial cable networks, fiber optic networks, wireless personal area networks (e.g., BLUETOOTH™), wireless local area networks (e.g., WI-FI™), CDMA, FDMA and TDMA cellular wireless networks, etc.

MMA 200 is configured to multiply matrices and generate output matrices to support various applications implemented by software modules 134.

Figure 10A:
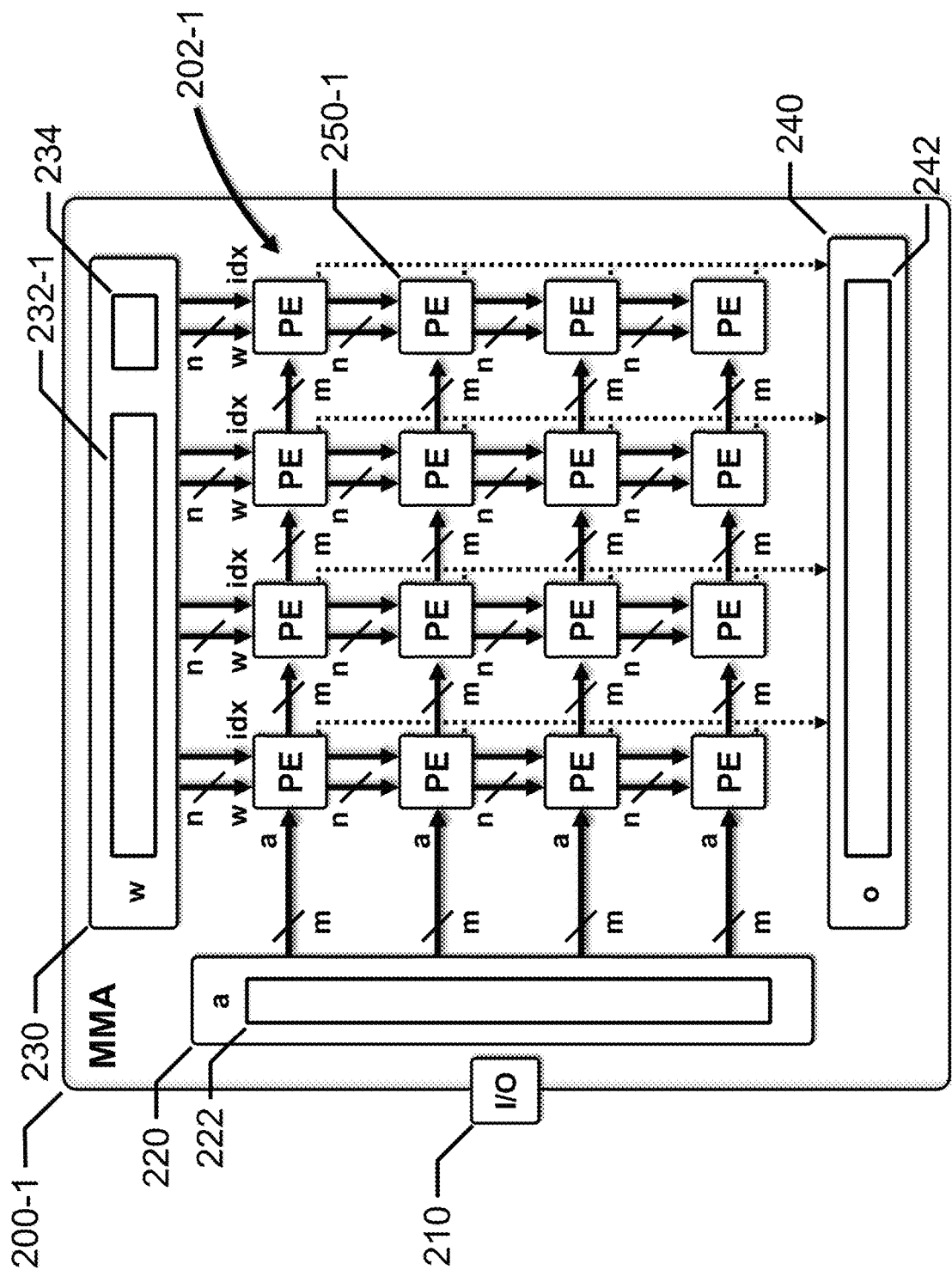
FIGS. 10A and 10B depict block diagrams of matrix multiply accelerators (MMAs), in accordance with embodiments of the present disclosure.
Figure 10B:
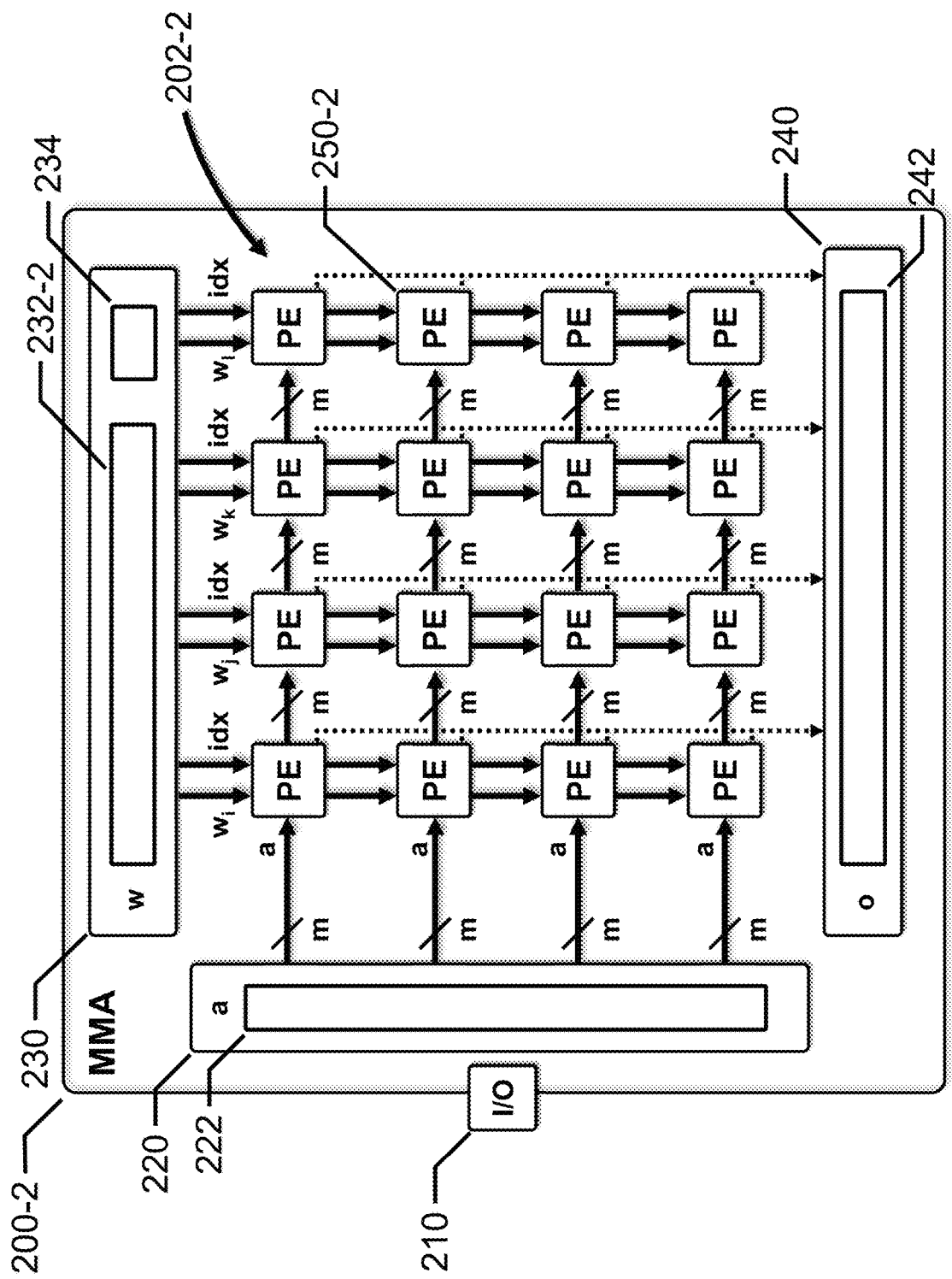

FIGS. 10A and 10B depict block diagrams of MMAs, in accordance with embodiments of the present disclosure.

FIG. 10A depicts a block diagram of MMA 200-1, in accordance with an embodiment of the present disclosure. MMA 200-1 includes PE array 202-1, I/O interface 210, register 220, register 230 and register 240.

In this embodiment, PE array 202-1 includes 16 PEs 250-1 arranged in a 4×4 array; other numbers of PEs 250-1 and arrangements are also contemplated, such as, for example, four PEs 250-1 arranged in a 2×2 array, nine PEs 250-1 arranged in a 3×3 array, 25 PEs 250-1 arranged in a 5×5 array, 36 PEs 250-1 arranged in a 6×6 array, 49 PEs 250-1 arranged in a 7×7 array, 64 PEs 250-1 arranged in a 8×8 array, etc. Non-symmetric arrangements, such as a 2×3 array, a 3×4 array, a 4×5 array, a 4×6 array, etc., may be advantageous for certain applications. Each PE 250-1 is coupled to register 220, register 230 and register 240, and calculates a dot product for one element of output matrix 40.

For example, PE 250-1 located in the first row and the first column (i.e., upper left corner) of PE array 202-1 calculates the dot product of the $1^{st}$ row of matrix 20 and the $1^{st}$ column of matrix 35, based on bitmap 30b, to generate the element for the first row and the first column (i.e., the upper left corner) of output matrix 40. Generally, the first row of PEs 250-1 receives the first row of data from matrix 20, the second row of PEs 250-1 receives the second row of data from matrix 20, and so on. Similarly, the first column of PEs 250-1 receives the first column of data from matrix 35, the second column of PEs 250-1 receives the second column of data from matrix 35, and so on. A more detailed description of the operation of PE 250-1 is provided below.

I/O interface 210 is coupled to bus 110, register 220, register 230 and register 240. I/O interface 210 includes a microcontroller that sends data to, and receives data and commands from, processor 120, memory 130, etc. The microcontroller implements a set of instructions that controls the data flow and the operation of PEs 250-1.

In some embodiments, a dedicated controller, microcontroller, field programmable gate array (FPGA), etc., may control the data flow and the operation of MMA 200-1. For example, the controller may implement load/store (L/S) instructions, memory mapped I/O (MMIO), direct memory access (DMA), etc., to load the compressed matrices and corresponding bitmaps into registers 220 and 230, start the matrix multiply operation, read back the output matrix from register 240, etc. More particularly, one or more software modules 134, executing on processor 120, may calculate the bitmaps and compress the matrices, send these data and the appropriate commands to MMA 200-1 to upload registers 220 and 230, start the matrix multiply operation, read back the results from register 240, etc.

Register 220 includes vector register 222. Vector register 222 stores the expanded elements of the uncompressed matrix in the multiplication operation, such as matrix 20. In this embodiment, vector register 222 is 32 elements wide, each element being the same size as the data contained within matrix 20, such as, for example, 8 bit integer data, 16 bit integer data, 32 bit integer data, 16 bit floating point data, 16 bit Bfloat data, 32 bit floating point data, etc.

Generally, vector register 222 simultaneously provides "m" elements to each row of PEs 250-1 in PE array 202-1. In this embodiment, vector register 222 simultaneously provides eight elements to each row of PEs 250-1 in PE array 202-1. As discussed above, vector register 222 may be divided into four individual vector registers, one for each row of matrix 20; in other embodiments, vector register 222 is a single register. In certain embodiments, vector register 222 has a depth of one register, which allows a single expanded matrix to be stored at one time. In other embodiments, vector register 222 has a depth of two or more registers, which allows multiple expanded matrices to be stored in a pipeline.

Register 230 includes vector register 232-1 and scalar register 234. Vector register 232-1 stores the expanded elements of the compressed matrix in the multiplication operation, such as matrix 35. Scalar register 234 stores the bitmap associated with the compressed matrix in the multiplication operation, such as bitmap 30b. In this embodiment, scalar register 234 is 32 bits wide, and vector register 232-1 is 16 elements wide, each element being the same size as the data contained within matrix 35, such as, for example, 8 bit integer data, 16 bit integer data, 32 bit integer data, 16 bit floating point data, 16 bit Bfloat data, 32 bit floating point data, etc.

Generally, vector register 232-1 simultaneously provides "n" elements to each column of PEs 250-1 in PE array 202-1. In this embodiment, vector register 232-1 simultaneously provides four elements to each column of PEs 250-1 in PE array 202-1. As discussed above, vector register 232-1 may be divided into four individual vector registers, one for each column of matrix 35; in other embodiments, vector register 232-1 is a single register. In certain embodiments, vector register 232 and scalar register 234 have a depth of one, which allows a single bitmap and compressed matrix to be stored at one time. In other embodiments, vector register 232 and scalar register 234 have a depth of two or more, which allows multiple bitmaps and compressed matrices to be stored in a pipeline.

Register 240 includes vector register 242, which stores the elements of the output matrix in the multiplication operation, such as output matrix 40. In this embodiment, vector register 242 is 16 elements wide, each element being the same size as the data contained within output matrix 40, such as, for example, 8 bit integer data, 16 bit integer data, 32 bit integer data, 16 bit floating point data, 16 bit Bfloat data, 32 bit floating point data, etc. In certain embodiments, vector register 242 has a depth of one register, which allows a single output matrix to be stored at one time. In other embodiments, vector register 242 has a depth of two or more registers, which allows multiple output matrices to be stored in a pipeline. Vector registers 222, 232-1 and 242 all have the same size, such as, for example, 8 bit integer data, etc.

MMA 200-1 preferably accommodates a weight matrix, such as matrix 30, with a sparsity ratio of 50%. When the sparsity ratio of the weight matrix is more, or less, than 50%, the utilization or efficiency of MMA 200-1 may drop proportionally. For example, for a sparsity ratio of 75%, the utilization or efficiency of MMA 200-1 may drop roughly 50%.

FIG. 10B depicts a block diagram of MMA 200-2, in accordance with an embodiment of the present disclosure. MMA 200-2 includes PE array 202-2, I/O interface 210, register 220, register 230 and register 240.

MMA 200-2 advantageously extends the performance of MMA 200-1 by accommodating any sparsity ratio, such as, for example, 25%, 50%, 62.5%, 75%, 87.5% etc. In other words, MMA 200-2 removes any sparsity constraints that may be levied during the training of the ANN. Essentially, the convolution calculation is unrolled in time based on the sparsity ratio of the weight matrix, such as matrix 30.

In this embodiment, PE array 202-2 includes 16 PEs 250-2 arranged in a 4×4 array; other numbers of PEs 250-2 and arrangements are also contemplated, such as, for example, four PEs 250-2 arranged in a 2×2 array, nine PEs 250-2 arranged in a 3×3 array, 25 PEs 250-2 arranged in a 5×5 array, 36 PEs 250-2 arranged in a 6×6 array, 49 PEs 250-2 arranged in a 7×7 array, 64 PEs 250-2 arranged in a 8×8 array, etc. Non-symmetric arrangements, such as a 2×3 array, a 3×4 array, a 4×5 array, a 4×6 array, etc., may be advantageous for certain applications. Each PE 250-2 is coupled to register 220, register 230 and register 240, and calculates a dot product for one element of output matrix 40.

For example, PE 250-2 located in the first row and the first column (i.e., upper left corner) of PE array 202-2 calculates the dot product of the $1^{st}$ row of matrix 20 and the $1^{st}$ column of matrix 35, based on bitmap 30b, to generate the element for the first row and the first column (i.e., the upper left corner) of output matrix 40. Generally, the first row of PEs 250-2 receives the first row of data from matrix 20, the second row of PEs 250-2 receives the second row of data from matrix 20, and so on. Similarly, the first column of PEs 250-2 receives the first column of data from matrix 35, the second column of PEs 250-2 receives the second column of data from matrix 35, and so on. A more detailed description of the operation of PE 250-2 is provided below.

I/O interface 210 is coupled to bus 110, register 220, register 230 and register 240. I/O interface 210 includes a microcontroller that sends data to, and receives data and commands from, processor 120, memory 130, etc. The microcontroller implements a set of instructions that controls the data flow and the operation of PEs 250-2.

In some embodiments, a dedicated controller, microcontroller, field programmable gate array (FPGA), etc., may control the data flow and the operation of MMA 200-2. For example, the controller may implement load/store (L/S) instructions, memory mapped I/O (MMIO), direct memory access (DMA), etc., to load the compressed matrices and corresponding bitmaps into registers 220 and 230, start the matrix multiply operation, read back the output matrix from register 240, etc. More particularly, one or more software modules 134, executing on processor 120, may calculate the bitmaps and compress the matrices, send these data and the appropriate commands to MMA 200-2 to upload registers 220 and 230, start the matrix multiply operation, read back the results from register 240, etc.

Register 220 includes vector register 222. Vector register 222 stores the expanded elements of the uncompressed matrix in the multiplication operation, such as matrix 20. In this embodiment, vector register 222 is 32 elements wide, each element being the same size as the data contained within matrix 20, such as, for example, 8 bit integer data, 16 bit integer data, 32 bit integer data, 16 bit floating point data, 16 bit Bfloat data, 32 bit floating point data, etc.

Generally, vector register 222 simultaneously provides "m" elements to each row of PEs 250-2 in PE array 202-2. In this embodiment, vector register 222 simultaneously provides eight elements to each row of PEs 250-2 in PE array 202-2. As discussed above, vector register 222 may be divided into four individual vector registers, one for each row of matrix 20; in other embodiments, vector register 222 is a single register. In certain embodiments, vector register 222 has a depth of one register, which allows a single expanded matrix to be stored at one time. In other embodiments, vector register 222 has a depth of two or more registers, which allows multiple expanded matrices to be stored in a pipeline.

Register 230 includes vector register 232-2 and scalar register 234. Vector register 232-2 stores the expanded elements of the compressed matrix in the multiplication operation, such as matrix 35. Scalar register 234 stores the bitmap associated with the second matrix in the multiplication operation, such as bitmap 30b. In this embodiment, scalar register 234 is 32 bits wide, and vector register 232-2 is 16 elements wide, each element being the same size as the data contained within matrix 35, such as, for example, 8 bit integer data, 16 bit integer data, 32 bit integer data, 16 bit floating point data, 16 bit Bfloat data, 32 bit floating point data, etc.

Generally, vector register 232-2 sequentially provides "n" elements to each column of PEs 250-2 in PE array 202-2. In this embodiment, vector register 232-2 sequentially provides four elements to each column of PEs 250-2 in PE array 202-2. As discussed above, vector register 232-2 may be divided into four individual vector registers, one for each column of matrix 35; in other embodiments, vector register 232-2 is a single register. In certain embodiments, vector register 232-2 and scalar register 234 have a depth of one, which allows a single bitmap and compressed matrix to be stored at one time. In other embodiments, vector register 232-2 and scalar register 234 have a depth of two or more, which allows multiple bitmaps and compressed matrices to be stored in a pipeline.

Register 240 includes vector register 242, which stores the elements of the output matrix in the multiplication operation, such as output matrix 40. In this embodiment, vector register 242 is 16 elements wide, each element being the same size as the data contained within output matrix 40, such as, for example, 8 bit integer data, 16 bit integer data, 32 bit integer data, 16 bit floating point data, 16 bit Bfloat data, 32 bit floating point data, etc. In certain embodiments, vector register 242 has a depth of one register, which allows a single output matrix to be stored at one time. In other embodiments, vector register 242 has a depth of two or more registers, which allows multiple output matrices to be stored in a pipeline. Vector registers 222, 232-2 and 242 all have the same size, such as, for example, 8 bit integer data, etc.

Figure 11A:
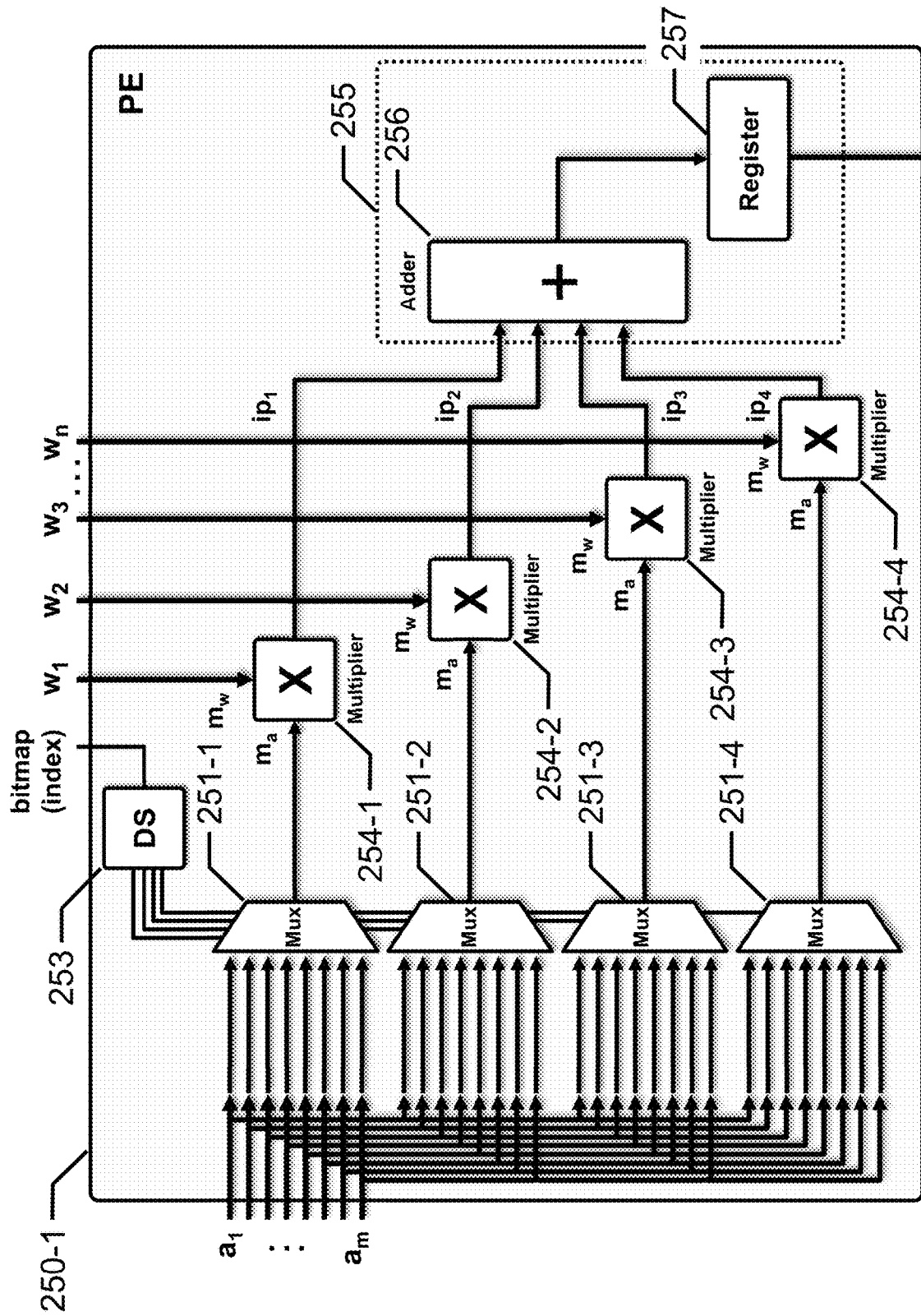
FIGS. 11A and 11B depict block diagrams of PEs for MMAs, in accordance with embodiments of the present disclosure.
Figure 11B:
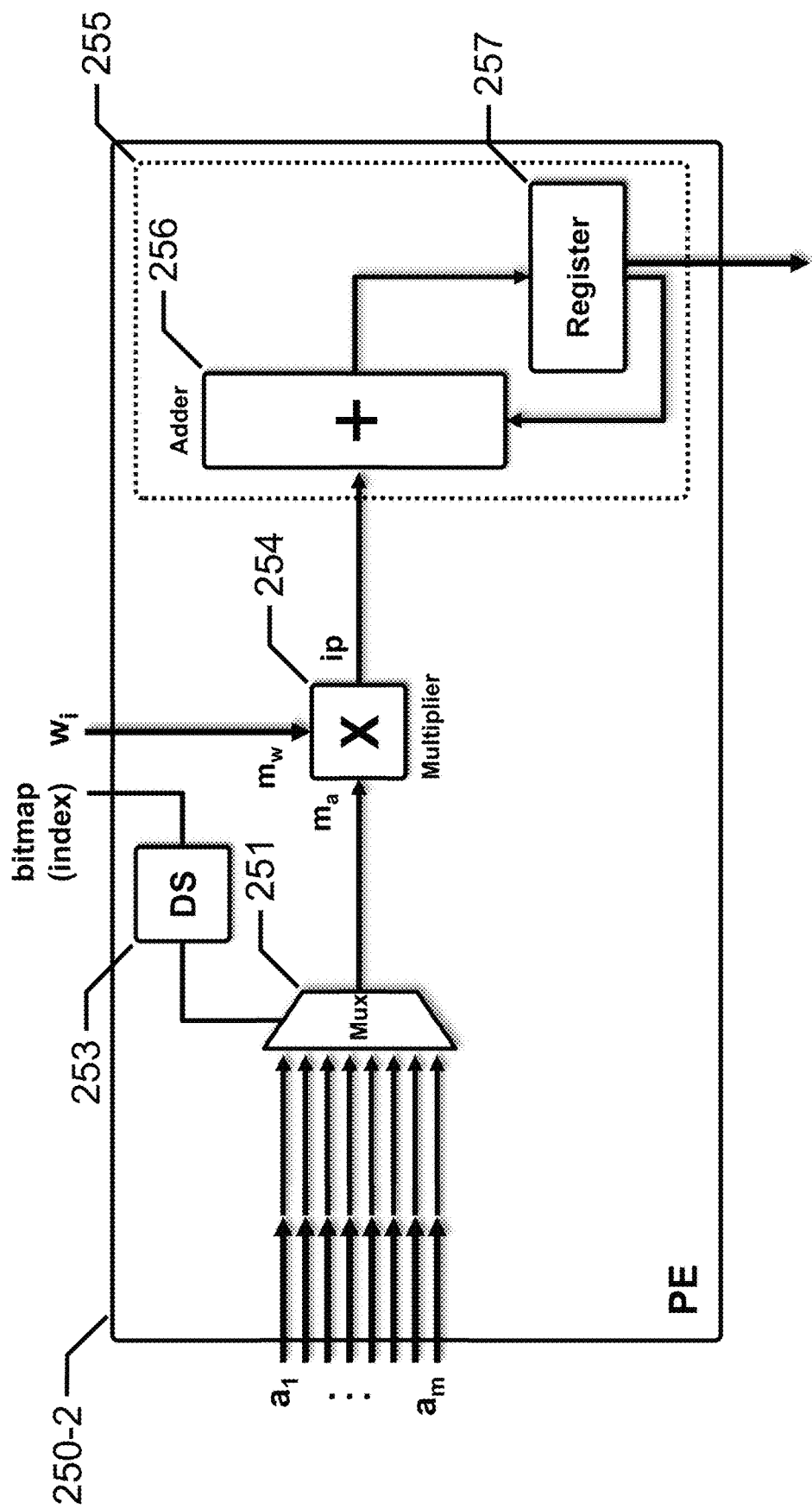

FIGS. 11A and 11B depict block diagrams of a PE for an MMA, in accordance with embodiments of the present disclosure.

FIG. 11A depicts PE 250-1 of MMA 200-1, in accordance with an embodiment of the present disclosure. PE 250-1 includes data selectors or multiplexers 251-1, 251-2, 251-3 and 251-4, data selection circuit 253, multiplier circuits 254-1, 254-2, 254-3 and 254-4, and accumulator circuit 255.

Data selection circuit 253 is coupled to scalar register 234 via a set of parallel data lines, and receives bitmap 30b or index 30c, associated with the compressed matrix, from scalar register 234. Data selection circuit 253 is configured to extract the appropriate portions from the bitmaps by applying a bitmask, performing a bit shift operation, etc.

Multiplexers 251-1, 251-2, 251-3 and 251-4 are collectively coupled to vector register 222 via "m" sets of parallel data lines. The number of parallel data line sets, "m," is equal to the number of columns in the uncompressed matrix in the multiplication operation, such as matrix 20. In the embodiment depicted in FIG. 11A, m equals 8; other matrix dimensions are also contemplated, as discussed above. Each parallel data line set transfers one element of one row of the uncompressed matrix from vector register 222 to each multiplexer 251-1, 251-2, 251-3 and 251-4. The number of parallel data lines in each set is equal to the size of the element in vector register 222, such as 8 for 8 bit integer data, 16 for 16-bit integer data, etc., as discussed above. In other words, the "m" sets of parallel data lines transfer one row of data from the uncompressed matrix, such as matrix 20. For example, for all of the PEs 250-1 located in the first row of PE array 202-1, the elements of the first row of data from matrix 20 that are transferred from vector register 222 are $a_{1,1}$, $a_{1,2}$, $a_{1,3}$, $a_{1,4}$, $a_{1,5}$, $a_{1,6}$, $a_{1,7}$ and $a_{1,8}$.

Multiplexers 251-1, 251-2, 251-3 and 251-4 are coupled to data selection circuit 253 via individual selection signal lines. Each selection signal line transmits a selection signal that commands the particular multiplexer 251-$i$ to select a respective set of parallel data lines to output to an associated multiplier circuit 254-$i$. In other words, each multiplexer 251-$i$ selects an element from vector register 222, and provides that element to the associated multiplier circuit 254-$i$. In the embodiment depicted in FIG. 11A, multiplexer 251-1 is coupled to multiplier circuit 254-1 via a set of parallel data lines, multiplexer 251-2 is coupled to multiplier circuit 254-2 via a set of parallel data lines, multiplexer 251-3 is coupled to multiplier circuit 254-3 via a set of parallel data lines, and multiplexer 251-4 is coupled to multiplier circuit 254-4 via a set of parallel data lines.

Multiplier circuits 254-1, 254-2, 254-3 and 254-4 are individually coupled to vector register 232-1 via one of "n" sets of parallel data lines. The number of parallel data line sets, "n," is equal to the number of rows in the compressed matrix in the multiplication operation, such as matrix 35. In the embodiment depicted in FIG. 11A, n equals 4; other matrix dimensions are also contemplated, as discussed above. Each parallel data line set transfers one element of one column of the compressed matrix from vector register 232-1 to each multiplier circuit 254-1, 254-2, 254-3 and 254-4. The number of parallel data lines in each set is equal to the size of the element in vector register 232-1, such as 8 for 8 bit integer data, 16 for 16-bit integer data, etc., as discussed above. In other words, the "n" sets of parallel data lines transfer one column of data from the compressed matrix, such as matrix 35. For example, for all of the PEs 250-1 located in the first column of PE array 202-1, the elements of the first column of data from matrix 35 that are transferred from vector register 232-1 are $w_{2,1}$, $w_{4,1}$, $w_{6,1}$ and $w_{8,1}$. Multiplier circuits 254-1, 254-2, 254-3 and 254-4 are also coupled to accumulator circuit 255 via sets of parallel data lines.

Multiplier circuits 254-$i$ multiplies the data value, $m_a$, provided by associated multiplexer 251-$i$ and the data value, $m_w$, provided by vector register 232-1, and outputs the resulting data value or intermediate product, $ip_i$, to accumulator circuit 255. The data values $m_a$ and $m_w$ and $ip_i$ have the same size, such as, for example, 8 bit integer, etc. For example, multiplier circuit 254-1 multiplies the data value, $m_a$, provided by associated multiplexer 251-1 and the data value, $m_w$ (i.e., $w_1$) provided by vector register 232-1, and outputs the resulting data value or intermediate product, $ip_1$, to accumulator circuit 255.

Similarly, multiplier circuit 254-2 multiplies the data value, $m_a$, provided by associated multiplexer 251-2 and the data value, $m_w$ (i.e., $w_2$) provided by vector register 232-1, and outputs the resulting data value or intermediate product, $ip_2$, to accumulator circuit 255, multiplier circuit 254-3 multiplies the data value, $m_a$, provided by associated multiplexer 251-3 and the data value, $m_w$ (i.e., $w_3$) provided by vector register 232-1, and outputs the resulting data value or intermediate product, $ip_3$, to accumulator circuit 255, and multiplier circuit 254-4 multiplies the data value, $m_a$, provided by associated multiplexer 251-4 and the data value, $m_w$ (i.e., $w_4$) provided by vector register 232-1, and outputs the resulting data value or intermediate product, $ip_4$, to accumulator circuit 255.

Accumulator circuit 255 includes adder circuit 256 and accumulator register 257. Generally, adder circuit 256 adds the intermediate products from multiplier circuits 254-1, 254-2, 254-3 and 254-4, and outputs the resulting data value to accumulator register 257. As discussed below, each PE 250-1 completes the dot product calculation in a single calculation cycle, and then outputs the data value to the corresponding element of vector register 242. In other words, accumulator circuit 255 receives the respective intermediate products from multiplier circuits 254-1, 254-2, 254-3 and 254-4, and adds or accumulates the respective intermediate products into a value for one element of output matrix 40.

During the dot product calculation cycle, data selection circuit 253 performs a selection cycle, multiplier circuits 254-1, 254-2, 254-3 and 254-4 perform four simultaneous multiply cycles, and accumulator circuit 255 then performs a quad add cycle. During the selection cycle, data selection circuit 253 determines, based on bitmap 30$b$ or index 30$c$, which elements of the row of the matrix 20 correspond to the elements of the matrix 35, i.e., the non-zero elements of the matrix 30, and generates and sends the appropriate selection signals to multiplexers 251-1, 251-2, 251-3 and 251-4.

More particularly, and in the interest of brevity, a single dot product calculation cycle will be described using the PE 250-1 located in the first row and the first column (i.e., upper left corner) of PE array 202-1. For this particular PE 250-1, the respective portion of bitmap 30$b$ is "01010101" or 0×55, and the elements of the first column of data from matrix 35 are $w_{2,1}$, $w_{4,1}$, $w_{6,1}$ and $w_{8,1}$, as depicted in FIG. 5. Accordingly, data selection circuit 253 determines that the second element, $a_2$, should be selected by multiplexer 251-1, the fourth element, $a_4$, should be selected by multiplexer 251-2, the sixth element, $a_6$, should be selected by multiplexer 251-3, and the eighth element, $a_8$, should be selected by multiplexer 251-4, and then generates and sends the appropriate selection signals to multiplexers 251-1, 251-2, 251-3 and 251-4.

Multiplexer 251-1 receives a selection signal from data selection circuit 253, selects and outputs the second element, $a_2$, to multiplier circuit 254-1. Multiplexer 251-2 receives a selection signal from data selection circuit 253, selects and outputs the fourth element, $a_4$, to multiplier circuit 254-2. Multiplexer 251-3 receives a selection signal from data selection circuit 253, selects and outputs the sixth element, $a_6$, to multiplier circuit 254-3. Multiplexer 251-4 receives a selection signal from data selection circuit 253, selects and outputs the eighth element, $a_8$, to multiplier circuit 254-4.

Multiplier circuit 254-1 receives the first element of the first column of matrix 35 from vector register 232-1, i.e., $w_{2,1}$, receives the second element of the first row of matrix 20 from multiplexer 251-1, i.e., $a_2$, multiplies $a_2$ and $w_{2,1}$ to generate intermediate product $ip_1$, and sends intermediate product $ip_1$ to adder circuit 256. Multiplier circuit 254-2 receives the second element of the first column of matrix 35 from vector register 232-1, i.e., $w_{4,1}$, receives the fourth element of the first row of matrix 20 from multiplexer 251-2, i.e., $a_4$, multiplies $a_4$ and $w_{4,1}$ to generate intermediate product $ip_2$, and sends intermediate product $ip_2$ to adder circuit 256. Multiplier circuit 254-3 receives the third element of the first column of matrix 35 from vector register 232-1, i.e., $w_{6,1}$, receives the sixth element of the first row of matrix 20 from multiplexer 251-2, i.e., $a_6$, multiplies $a_6$ and $w_{6,1}$ to generate intermediate product $ip_3$, and sends intermediate product $ip_3$ to adder circuit 256. Multiplier circuit 254-4 receives the fourth element of the first column of matrix 35 from vector register 232-1, i.e., $w_{8,1}$, receives the eighth element of the first row of matrix 20 from multiplexer 251-2, i.e., $a_8$, multiplies $a_8$ and $w_{8,1}$ to generate intermediate product $ip_4$, and sends intermediate product $ip_4$ to adder circuit 256.

Adder circuit 256 adds intermediate products $ip_1$, $ip_2$, $ip_3$ and $ip_4$, and outputs the resulting data value to accumulator register 257, which is subsequently output to vector register 242.

FIG. 11B depicts PE 250-2 of MMA 200-2, in accordance with an embodiment of the present disclosure. PE 250-2 includes multiplexer 251, data selection circuit 253, multiplier circuit 254, and accumulator circuit 255.

PE 250-2 has a single multiplier circuit 254 and a simple (i.e., two element) adder circuit 256, while PE 250-1 has four multiplier circuits 254-1, 254-2, 254-3 and 254-4, and a complicated (i.e., four element) adder circuit 256. Because the datapath for PE 250-2 is roughly four times (×4) smaller than the datapath for PE 250-1, the multiplication of the same dense matrix, such as matrix 20, and the same 50% sparse matrix, such as matrix 30, is computed using four calculation cycles. Each calculation cycle consumes one row of the compressed matrix, such as matrix 35, and uses same data from the uncompressed matrix, such as matrix 20. After the last calculation cycle has finished, the results are transferred from the respective accumulator registers 257 to the vector register 242. From one perspective, the 4 MAC summation operations performed by PE 250-1 in the spatial domain have been unrolled into the 4 calculation cycles performed by PE 250-2 in the time domain.

Advantageously, PE 250-2 supports sparsity ratios from 0% to 100% at granularity of 12.5%; other granularities are also contemplated. Additionally, PE 250-2 advantageously processes different sparsity matrices efficiently without utilization or efficiency loss. For example, PE 250-2 processes a 75% sparse matrix at the same efficiency as a 50% sparse matrix, i.e., 100%. In this example, PE 250-2 calculates the dot product in two calculation cycles with 100% utilization, while PE 250-1 calculates the dot product in one calculation cycle with 50% utilization.

Data selection circuit 253 is coupled to scalar register 234 via a set of parallel data lines, and receives bitmap 30b or index 30c, associated with the compressed matrix, from scalar register 234. Data selection circuit 253 is configured to extract the appropriate portions from the bitmaps by applying a bitmask, performing a bit shift operation, etc.

Multiplexer 251 is coupled to vector register 222 via "m" sets of parallel data lines. The number of parallel data line sets, "m," is equal to the number of columns in the uncompressed matrix in the multiplication operation, such as matrix 20. In the embodiment depicted in FIG. 11B, m equals 8; other matrix dimensions are also contemplated, as discussed above. Each parallel data line set transfers one element of one row of the uncompressed matrix from vector register 222 to multiplexer 251. The number of parallel data lines in each set is equal to the size of the element in vector register 222, such as 8 for 8 bit integer data, 16 for 16-bit integer data, etc., as discussed above. In other words, the "m" sets of parallel data lines transfer one row of data from the uncompressed matrix, such as matrix 20. For example, for all of the PEs 250-2 located in the first row of PE array 202-2, the elements of the first row of data from matrix 20 that are transferred from vector register 222 are $a_{1,1}$, $a_{1,2}$, $a_{1,3}$, $a_{1,4}$, $a_{1,5}$, $a_{1,6}$, $a_{1,7}$ and $a_{1,8}$.

Multiplexer 251 is coupled to data selection circuit 253 via a selection signal line that transmits a selection signal that commands multiplexer 251 to select a respective set of parallel data lines to output to multiplier circuit 254.

Multiplier circuit 254 is coupled to vector register 232-2 via one set of parallel data lines that sequentially transfers each element of a column of the compressed matrix, such as matrix 35, from vector register 232-2 to multiplier circuit 254. The number of parallel data lines in each set is equal to the size of the element in vector register 232-2, such as 8 for 8 bit integer data, 16 for 16-bit integer data, etc., as discussed above. For example, for all of the PEs 250-2 located in the first column of PE array 202-2, the elements of the first column of data from matrix 35 that are sequentially transferred from vector register 232-1 are $w_{2,1}$, $w_{4,1}$, $w_{6,1}$ and $w_{8,1}$. Multiplier circuit 254 is also coupled to accumulator circuit 255 via a set of parallel data lines.

Multiplier circuit 254 multiplies the data value, $m_a$, provided by multiplexer 251 and the data value, $m_w$, provided by vector register 232-2, and outputs the resulting data value or intermediate product, ip, to accumulator circuit 255. The data values $m_a$, $m_w$ and ip have the same size, such as, for example, 8 bit integer, etc. For example, multiplier circuit 254 multiplies the data value, $m_a$, provided by multiplexer 251 and the data value, $m_w$ (i.e., $w_i$) provided by vector register 232-2, and outputs the resulting data value or intermediate product, ip, to accumulator circuit 255.

Accumulator circuit 255 includes adder circuit 256 and accumulator register 257. Adder circuit 256 adds the intermediate product ip from multiplier circuit 254 with the current data value stored in accumulator register 257, and outputs the resulting data value to accumulator register 257. As discussed below, each PE 250-2 completes the dot product calculation in four calculation cycles; at the end of the last calculation cycle, accumulator register 257 outputs a final accumulated data value to the corresponding element of vector register 242. In other words, accumulator circuit 255 receives the respective intermediate products from multiplier circuit 254, and accumulates the respective intermediate products into a value for one element of output matrix 40.

During the dot product calculation, data selection circuit 253 performs n selection cycles, and multiplier circuit 254 and accumulator circuit 255 perform n multiply and add (MAC) cycles. Generally, during each selection cycle, data selection circuit 253 determines, based on bitmap 30b or index 30c, which element of the row of matrix 20 corresponds to the element of matrix 35, i.e., the non-zero element of the second matrix 30, and generates and sends the appropriate selection signals to multiplexer 251.

More particularly, and in the interest of brevity, an example dot product calculation will be described using the PE 250-2 located in the first row and the first column (i.e., upper left corner) of PE array 202-2. For this particular PE 250-2, the respective portion of bitmap 30b is "01010101" or 0×55, and the elements of the first column of data from second matrix 35 are $w_{2,1}$, $w_{4,1}$, $w_{6,1}$ and $w_{8,1}$, as depicted in FIG. 5.

During the $1^{st}$ calculation cycle, data selection circuit 253 determines, based on bitmap 30b or index 30c, that the second element, $a_2$, should be selected by multiplexer 251, generates and sends the appropriate selection signal to multiplexer 251. Multiplexer 251 receives the selection signal from data selection circuit 253, selects and outputs the second element, $a_2$, to multiplier circuit 254. Multiplier circuit 254 receives the first element of the first column of matrix 35 from vector register 232-2, i.e., $w_{2,1}$, receives the second element of the first row of matrix 20 from multiplexer 251, i.e., $a_2$, multiplies $a_2$ and $w_{2,1}$ to generate the intermediate product ip, and sends the intermediate product ip to adder circuit 256. Adder circuit 256 adds the intermediate product ip to the value stored with accumulator register 257, and outputs the resulting data value to accumulator register 257.

During the $2^{nd}$ calculation cycle, data selection circuit 253 determines, based on bitmap 30b or index 30c, that the fourth element, $a_4$, should be selected by multiplexer 251, generates and sends the appropriate selection signal to multiplexer 251. Multiplexer 251 receives the selection signal from data selection circuit 253, selects and outputs the fourth element, $a_4$, to multiplier circuit 254. Multiplier circuit 254 receives the second element of the first column of matrix 35 from vector register 232-2, i.e., $w_{4,1}$, receives the fourth element of the first row of matrix 20 from multiplexer 251, i.e., $a_4$, multiplies $a_4$ and $w_{4,1}$ to generate the intermediate product ip, and sends the intermediate product ip to adder circuit 256. Adder circuit 256 adds the intermediate product ip to the value stored with accumulator register 257, and outputs the resulting data value to accumulator register 257.

During the $3^{rd}$ calculation cycle, data selection circuit 253 determines, based on bitmap 30b or index 30c, that the sixth element, $a_6$, should be selected by multiplexer 251, generates and sends the appropriate selection signal to multiplexer 251. Multiplexer 251 receives the selection signal from data selection circuit 253, selects and outputs the sixth element, $a_6$, to multiplier circuit 254. Multiplier circuit 254 receives the third element of the first column of matrix 35 from vector register 232-2, i.e., $w_{6,1}$, receives the sixth element of the first row of matrix 20 from multiplexer 251, i.e., $a_6$, multiplies $a_6$ and $w_{6,1}$ to generate the intermediate product ip, and sends the intermediate product ip to adder circuit 256. Adder circuit 256 adds the intermediate product ip to the value stored with accumulator register 257, and outputs the resulting data value to accumulator register 257.

During the $4^{th}$ calculation cycle, data selection circuit 253 determines, based on bitmap 30b or index 30c, that the eighth element, $a_8$, should be selected by multiplexer 251, generates and sends the appropriate selection signal to multiplexer 251. Multiplexer 251 receives the selection signal from data selection circuit 253, selects and outputs the eighth element, $a_8$, to multiplier circuit 254. Multiplier circuit 254 receives the fourth element of the first column of matrix 35 from vector register 232-2, i.e., $w_{8,1}$, receives the eighth element of the first row of matrix 20 from multiplexer 251, i.e., $a_8$, multiplies $a_8$ and $w_{8,1}$ to generate the intermediate product ip, and sends the intermediate product ip to adder circuit 256. Adder circuit 256 adds the intermediate product ip to the value stored with accumulator register 257, and outputs the resulting data value to accumulator register 257.

At the end of the $4^{th}$ calculation cycle, the current value stored in accumulator register 257 is output to vector register 242.

Figure 12:
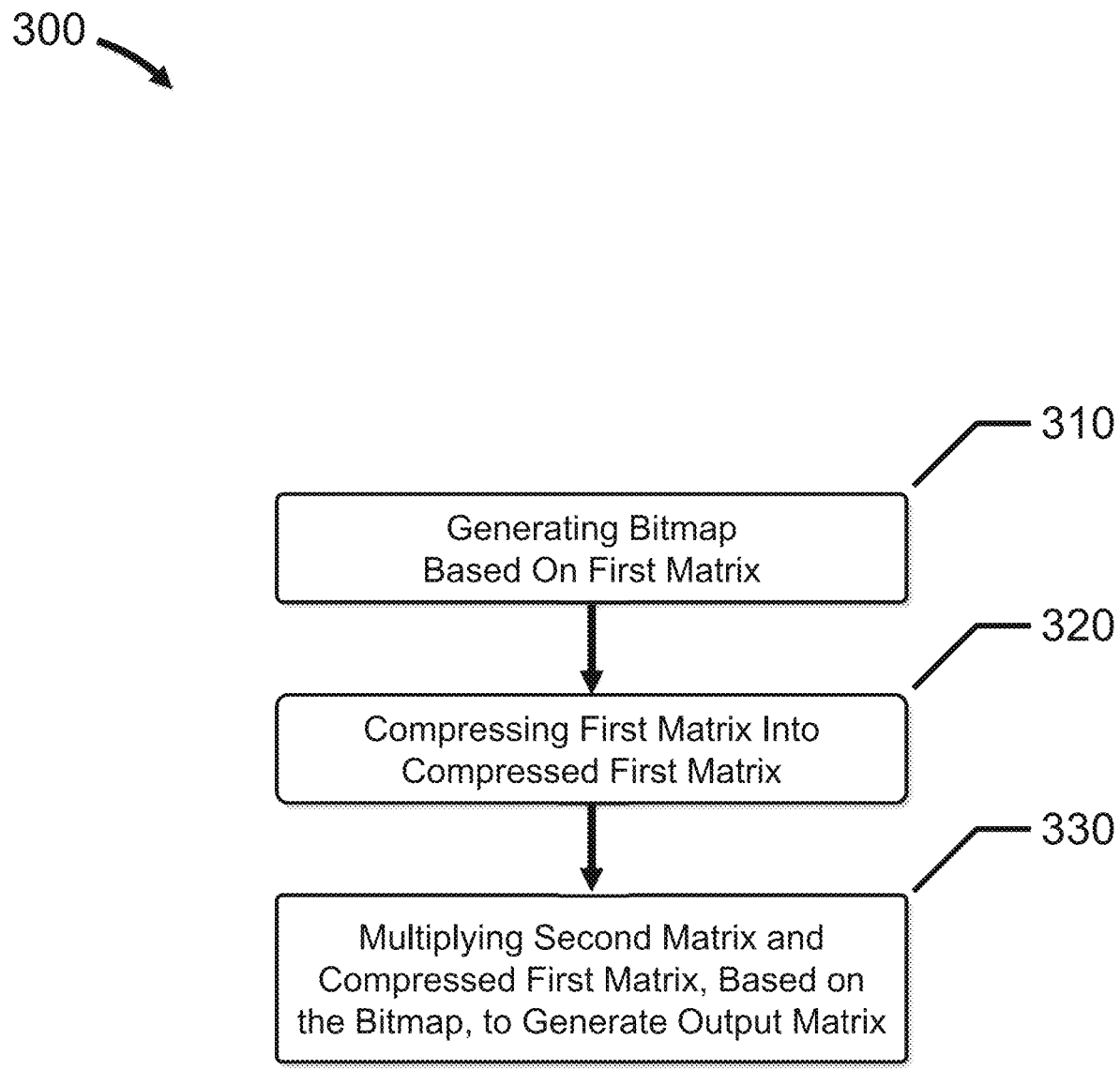
FIG. 12 depicts a flow diagram representing functionality associated with multiplying matrices, in accordance with an embodiment of the present disclosure.

FIG. 12 depicts flow diagram 300 representing functionality associated with multiplying matrices, in accordance with an embodiment of the present disclosure.

At 310, a bitmap is generated based on a first matrix having a plurality of elements, the bitmap including a plurality of bit positions, each bit position corresponding to a different element of the first matrix. In the embodiments discussed above, bitmap 30b is the bitmap, and matrix 30 is the first matrix. Bitmap generation may be performed offline or at runtime.

At 320, the first matrix is compressed into a compressed first matrix having fewer elements than the first matrix. In the embodiments discussed above, matrix 35 is the compressed first matrix. Matrix compression may be performed offline or at runtime.

At 330, a second matrix and the compressed first matrix are multiplied, based on the bitmap, to generate an output matrix, which includes, for each element i,j of the output matrix, calculating a dot product of the $i^{th}$ row of the second matrix and the $j^{th}$ column of the compressed first matrix based on the bitmap. In the embodiments discussed above, matrix 20 is the second matrix, and matrix 40 is the output matrix. Matrix multiplication is performed at runtime.

In the "transposed" embodiment, a transposed matrix 30 (4×8) may be multiplied with a transposed matrix 20 (8×4) to produce a transposed output matrix 40 (4×4), and a transposed version of matrix 35 may be generated. In this embodiment, transposed matrix 35 is the compressed first matrix, transposed matrix 20 is the second matrix, and transposed matrix 40 is the output matrix, and, at 330, the compressed first matrix and the second matrix are multiplied, based on the bitmap, to generate an output matrix, which includes, for each element i,j of the output matrix, calculating a dot product of the $i^{th}$ row of the compressed first matrix and the $j^{th}$ column of the second matrix and the based on the bitmap. Matrix multiplication is performed at runtime.

In one embodiment, a system includes a processor, coupled to a memory, and a matrix multiply accelerator (MMA) coupled to the processor. The MMA is configured to multiply, based on a bitmap, a compressed first matrix and a second matrix to generate an output matrix including, for each element i,j of the output matrix, calculate a dot product of an $i^{th}$ row of the compressed first matrix and a $j^{th}$ column of the second matrix based on the bitmap. Or, the MMA is configured to multiply, based on the bitmap, the second matrix and the compressed first matrix and to generate the output matrix including, for each element i,j of the output matrix, calculate a dot product of an $i^{th}$ row of the second matrix and a $j^{th}$ column of the compressed first matrix based on the bitmap. The bitmap includes a plurality of bit positions, and each bit position corresponds to a different element of the first matrix.

In another embodiment of the system, the processor is configured to generate the bitmap based on a first matrix having a plurality of elements, and compress the first matrix into the compressed first matrix having fewer elements than the first matrix. Each bit position has a value of 1 when a value of the corresponding element of the first matrix is not 0, and a value of 0 when the value of the corresponding element of the first matrix is 0.

In another embodiment of the system, compress the first matrix includes for each column of the first matrix, move each element of the column that has a non-zero value into a corresponding column of the compressed first matrix.

In another embodiment of the system, the MMA includes a scalar register to store the bitmap; a first vector register to store the compressed first matrix; a second vector register to store the second matrix; an output vector register to store the output matrix; and an array of processing engines (PEs), each PE coupled to the scalar register, the first vector register, the second vector register and the output vector register, each PE configured to calculate the dot product for a different element of the output matrix.

In another embodiment of the system, each PE includes a data selection circuit, a plurality of data selectors, a plurality of multiplier circuits and an accumulator circuit. The data selection circuit is configured to receive the bitmap and generate a plurality of data selection signals based on the bitmap, The plurality of data selectors are coupled to the data selection circuit, and each data selector is configured to receive one of the data selection signals from the data selection circuit, receive a row of the second matrix, the row having a plurality of elements, and selectively output one of the elements of the row based on the data selection signal. Each multiplier circuit is coupled to a respective data selector, and is configured to receive a column element of a same column of the compressed first matrix, receive the row element selectively output by the respective data selector, multiply the column element and the row element to generate an intermediate product, and output the intermediate product. The accumulator circuit is coupled to the plurality of multiplier circuits, and is configured to receive the intermediate products from the multiplier circuits, add the intermediate products to generate an element of the output matrix, and output the element of the output matrix.

In another embodiment of the system, the data selectors are multiplexers.

In another embodiment of the system, the array of PEs includes 16 PEs, each PE includes four multiplexers and four multiplier circuits, each multiplexer has eight input ports and one output port, the bitmap includes 32 bits, the compressed first matrix is a 4×4 matrix, the second matrix is a 4×8 matrix and the output matrix is a 4×4 matrix.

In another embodiment of the system, each PE includes a data selection circuit, a data selector, a multiplier circuit and an accumulator circuit. The data selection circuit is configured to receive the bitmap and generate a data selection signal based on the bitmap. The data selector is coupled to the data selection circuit, and is configured to receive a row of the second matrix, the row having a plurality of elements, and selectively output one of the elements of the row based on the data selection signal. The multiplier circuit is coupled to the data selector, is configured to receive a column element of a column of the compressed first matrix, receive the row element selectively output by the data selector, multiply the column element and the row element to generate an intermediate product, and output the intermediate product. The accumulator circuit is coupled to the multiplier circuit, and is configured to receive the intermediate product from the multiplier circuit, accumulate the intermediate product into an element of the output matrix, and output the element of the output matrix after a last column element has been received by the multiplier circuit.

In another embodiment of the system, the data selector is a multiplexer.

In another embodiment of the system, the array of PEs includes 16 PEs, the multiplexer has eight input ports and one output port, the bitmap includes 32 bits, the compressed first matrix is a 4×4 matrix, the second matrix is a 4×8 matrix and the output matrix is a 4×4 matrix.

In one embodiment, a computer-based method for multiplying matrices includes multiplying, based on a bitmap, a compressed first matrix and a second matrix to generate an output matrix including, for each element i,j of the output matrix, calculating a dot product of an $i^{th}$ row of the compressed first matrix and a $j^{th}$ column of the second matrix based on the bitmap; or multiplying, based on the bitmap, the second matrix and the compressed first matrix to generate the output matrix including, for each element i,j of the output matrix, calculating a dot product of an $i^{th}$ row of the second matrix and a $j^{th}$ column of the compressed first matrix based on the bitmap. The bitmap includes a plurality of bit positions, and each bit position corresponds to a different element of the first matrix.

In another embodiment of the method, the method further includes generating the bitmap based on a first matrix having a plurality of elements; and compressing the first matrix into the compressed first matrix having fewer elements than the first matrix. Each bit position has a value of 1 when a value of the corresponding element of the first matrix is not 0, and a value of 0 when the value of the corresponding element of the first matrix is 0.

In another embodiment of the method, compressing the first matrix includes for each column of the first matrix, moving each element of the column that has a non-zero value into a corresponding column of the compressed first matrix.

In another embodiment of the method, calculating the dot product is performed by a matrix multiply accelerator that includes a scalar register, a first vector register, a second vector register, an output vector register and an array of processing engines (PEs), and the computer-based method further comprises storing the bitmap in the scalar register; storing the compressed first matrix in the first vector register; storing the second matrix in the second vector register; storing the output matrix in the output vector register; and calculating, by each PE, the dot product for a different element of the output matrix.

In another embodiment of the method, each PE includes a data selection circuit, a plurality of data selectors, a plurality of multiplier circuits, each multiplier circuit coupled to a respective data selector, and an accumulator circuit coupled to the multiplier circuits, and the computer-based method further comprises additional functionality. At the data selection circuit: receiving the bitmap, and generating a plurality of data selection signals based on the bitmap. At each data selector: receiving one of the data selection signals from the data selection circuit, receiving a row of the second matrix, the row having a plurality of elements, and selectively outputting one of the elements of the row based on the data selection signal. At each multiplier circuit: receiving a column element of a same column of the compressed first matrix, receiving the row element selectively output by the respective data selector, multiplying the column element and the row element to generate an intermediate product, and outputting the intermediate product. At the accumulator circuit: receiving the intermediate products from the multiplier circuits, adding the intermediate products to generate an element of the output matrix, and outputting the element of the output matrix.

In another embodiment of the method, the data selectors are multiplexers.

In another embodiment of the method, the array of PEs includes 16 PEs, each PE includes four multiplexers and four multiplier circuits, each multiplexer has eight input ports and one output port, the bitmap includes 32 bits, the compressed first matrix is a 4×4 matrix, the second matrix is a 4×8 matrix and the output matrix is a 4×4 matrix.

In another embodiment of the method, each PE includes a data selection circuit, a data selector, a multiplier circuit coupled to the data selector, and an accumulator circuit, and the computer-based method further comprises additional functionality. At the data selection circuit: receiving the bitmap, and generating a data selection signal based on the bitmap. At the data selector: receiving a row of the second matrix, the row having a plurality of elements, and selectively outputting one of the elements of the row based on the data selection signal. At the multiplier circuit: receiving a column element of a column of the compressed first matrix, receiving the row element selectively output by the data selector, multiplying the column element and the row element to generate an intermediate product, and outputting the intermediate product. At the accumulator circuit: receiving the intermediate product from the multiplier circuit, accumulating the intermediate product into an element of the output matrix, and outputting the element of the output matrix after a last column element has been received by the multiplier circuit.

In another embodiment of the method, the data selector is a multiplexer.

In another embodiment of the method, the array of PEs includes 16 PEs, the multiplexer has eight input ports and one output port, the bitmap includes 32 bits, the compressed first matrix is a 4×4 matrix, the second matrix is a 4×8 matrix and the output matrix is a 4×4 matrix.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system, comprising:
a processor coupled to a memory; and
a matrix multiply accelerator (MMA) having an array of processing engines (PEs) coupled to the processor, configured to:
multiply, based on a bitmap or index, a compressed first matrix and selected elements of a second matrix to generate an output matrix over a number of calculation cycles, the bitmap or index relating elements of the compressed first matrix to corresponding elements of a first matrix from which the compressed first matrix is derived, said multiply including:
for each element i,j of the output matrix, calculate a dot product of an $i^{th}$ row of the compressed first matrix and selected elements of a $j^{th}$ column of the second matrix based on the bitmap or index; or
multiply, based on the bitmap or index, selected elements of the second matrix and the compressed first matrix and to generate the output matrix over a number of calculation cycles, said multiply including:

for each element i,j of the output matrix, calculate a dot product of selected elements of an $i^{th}$ row of the second matrix and a $j^{th}$ column of the compressed first matrix based on the bitmap or index, where a PE of the array of PEs is coupled to a first vector register storing a row or column of the compressed first matrix as a first compressed vector and a second vector register storing a column or row of the second matrix as a second vector, the PE including a single multiplier circuit, a multiplexer circuit and an accumulator circuit and configured to:

for each calculation cycle:
select, by the multiplexer circuit, an element of the second vector from the second vector register based on the bitmap or index;
multiply, by the multiplier circuit, an element of the first compressed vector and the selected element of the second vector to produce an intermediate product; and
accumulate, by the accumulator circuit, the intermediate product to update a dot product of the first compressed vector; and selected elements of the second vector; and
store the dot product in an output register as element i,j of the output matrix,
where each calculation cycle consumes one element of the first compressed vector.

2. The system of claim 1, where each bit position of the bitmap has a value of 1 when a value of the corresponding element of the first matrix is not 0, and a value of 0 when the value of the corresponding element of the first matrix is 0.

3. The system of claim 1, where said index comprises:
for each non-zero element of the compressed first matrix, a position of a corresponding non-zero element in the first matrix.

4. A system, comprising:
a processor coupled to a memory; and
a matrix multiply accelerator (MMA) having an array of processing engines (PEs) each having a single multiplier circuit, coupled to the processor, configured to:
generate a bitmap based on a first matrix having a plurality of elements; and
compress the first matrix into a compressed first matrix having fewer elements than the first matrix;
multiply, based on the bitmap, the compressed first matrix and a second matrix to generate an output matrix over a number of calculation cycles based upon a sparsity ratio of the first matrix before compression, from which the compressed first matrix is derived, the bitmap including a plurality of bit positions, each bit position corresponding to a different element of the first matrix, said multiply including:
for each element i,j of the output matrix, calculate a dot product of an $i^{th}$ row of the compressed first matrix and a $i^{th}$ column of the second matrix based on the bitmap; or
multiply, based on the bitmap, the second matrix and the compressed first matrix and to generate the output matrix over a number of calculation cycles based upon the sparsity ratio of the first matrix before compression, from which the compressed first matrix is derived, said multiply including:
for each element i,j of the output matrix, calculate a dot product of an $i^{th}$ row of the second matrix and a $j^{th}$ column of the compressed first matrix based on the bitmap,
where the MMA includes:

a scalar register to store the bitmap;
a first vector register to store the compressed first matrix;
a second vector register to store the second matrix;
an output vector register to store the output matrix; and,
with each PE of the array of PEs coupled to the scalar register, the first vector register, the second vector register and the output vector register, and each PE configured to calculate the dot product for a different element of the output matrix.

5. The system of claim 4, where each PE includes:
a data selection circuit configured to receive the bitmap and generate a data selection signal based on the bitmap;
a data selector, coupled to the data selection circuit, configured to:
receive a row of the second matrix, the row having a plurality of elements, and
selectively output one row element of the plurality of elements of the row based on the data selection signal;
the single multiplier circuit, coupled to the data selector, configured to:
receive a column element of a column of the compressed first matrix,
receive the row element selectively output by the data selector,
multiply the column element and the row element to generate an intermediate product, and
output the intermediate product; and
an accumulator circuit, coupled to the single multiplier circuit, configured to:
receive the intermediate product from the single multiplier circuit,
accumulate the intermediate product into an element of the output matrix, and
output the element of the output matrix after a last column element has been received by the single multiplier circuit.

6. The system of claim 5, where the data selector is a multiplexer.

7. The system according to claim 6, where the array of PEs includes 16 PEs, the multiplexer has eight input ports and one output port, the bitmap includes 32 bits, the compressed first matrix is a 4×4 matrix, the second matrix is a 4×8 matrix and the output matrix is a 4×4 matrix.

8. A computer-based method for multiplying matrices, comprising:
a matrix multiply accelerator (MMA) having an array of processing engines (PEs) multiplying, based on a bitmap or index, a compressed first matrix and a second matrix to generate an output matrix over a number of calculation cycles, the bitmap or index relating elements of the compressed first matrix to corresponding elements of a first matrix from which the compressed first matrix is derived, said multiplying including:
for each element i,j of the output matrix, calculating a dot product of an $i^{th}$ row of the compressed first matrix and selected elements of a $j^{th}$ column of the second matrix based on the bitmap or index; or
the matrix multiply accelerator (MMA) multiplying, based on the bitmap or index, selected elements of the second matrix and the compressed first matrix to generate the output matrix over a number of calculation cycles, said multiplying including:
for each element i,j of the output matrix, calculating a dot product of selected elements of an $i^{th}$ row of the second matrix and a $j^{th}$ column of the compressed first matrix based on the bitmap or index, where calculating a dot product in a PE of the array of PEs includes:

storing a row or column of the compressed first matrix in a first vector register as a first compressed vector;

storing a column or row of the second matrix in a second vector register as a second vector;

for each calculation cycle:

selecting, by a multiplexer circuit of the PE, an element of a second vector from the second vector register based on the bitmap or index;

multiplying, by a multiplier circuit of the PE, an element of the first compressed vector and the selected element of the second vector to produce an intermediate product; and accumulating, by an accumulator circuit of the PE, the intermediate product to update a dot product of the first compressed vector and selected elements of the second vector; and storing the dot product in an output register as element i,j of the output matrix, where each calculation cycle consumes one element of the first compressed vector.

9. The computer-based method of claim 8, where each bit position of the bitmap has a value of 1 when a value of the corresponding element of the first matrix is not 0, and a value of 0 when the value of the corresponding element of the first matrix is 0.

10. The computer-based method of claim 8, where said index comprises:

for each non-zero element of the compressed first matrix, a position of a corresponding non-zero element in the first matrix.

11. A computer-based method for multiplying matrices, comprising:

generating a bitmap based on a first matrix having a plurality of elements; and compressing the first matrix into a compressed first matrix having fewer elements than the first matrix;

a matrix multiply accelerator (MMA) having an array of processing engines (PEs) each having a single multiplier circuit multiplying, based on the bitmap, the compressed first matrix and a second matrix to generate an output matrix over a number of calculation cycles based upon a sparsity ratio of the first matrix before compression, from which the compressed first matrix is derived, the bitmap including a plurality of bit positions, each bit position corresponding to a different element of the first matrix, said multiplying including:

for each element i,j of the output matrix, calculating a dot product of an $i^{th}$ row of the compressed first matrix and a $j^{th}$ column of the second matrix based on the bitmap; or a matrix multiply accelerator (MMA) multiplying, based on the bitmap, the second matrix and the compressed first matrix to generate the output matrix over a number of calculation cycles based upon the sparsity ratio of the uncompressed first matrix from which the compressed first matrix is derived, said multiplying including:

for each element i,j of the output matrix, calculating a dot product of an $i^{th}$ row of the second matrix and a $j^{th}$ column of the compressed first matrix based on the bitmap, where said calculating the dot product is performed by a matrix multiply accelerator that includes a scalar register, a first vector register, a second vector register, an output vector register and an array of processing engines (PEs), and the computer-based method further comprises:

storing the bitmap in the scalar register;

storing the compressed first matrix in the first vector register;

storing the second matrix in the second vector register;

storing the output matrix in the output vector register; and calculating, by each PE of the array of PEs, the dot product for a different element of the output matrix.

12. The computer-based method of claim 11, where each PE includes a data selection circuit, a data selector, a multiplier circuit coupled to the data selector, and an accumulator circuit, and the computer-based method further comprises:

at the data selection circuit:

receiving the bitmap, and generating a data selection signal based on the bitmap;

at the data selector:

receiving a row of the second matrix, the row having a plurality of elements, and selectively outputting one row element of the plurality of elements of the row based on the data selection signal;

at the single multiplier circuit:

receiving a column element of a column of the compressed first matrix, receiving the row element selectively output by the data selector, multiplying the column element and the row element to generate an intermediate product, and outputting the intermediate product; and at the accumulator circuit:

receiving the intermediate product from the single multiplier circuit, accumulating the intermediate product into an element of the output matrix, and outputting the element of the output matrix after a last column element has been received by the single multiplier circuit.

13. The computer-based method of claim 12, where the data selector is a multiplexer.

14. The computer-based method of claim 13, where the array of PEs includes 16 PEs, the multiplexer has eight input ports and one output port, the bitmap includes 32 bits, the compressed first matrix is a 4×4 matrix, the second matrix is a 4×8 matrix and the output matrix is a 4×4 matrix.

* * * * *